US010481861B2

(12) United States Patent
Kogan et al.

(10) Patent No.: US 10,481,861 B2
(45) Date of Patent: Nov. 19, 2019

(54) USING USER INPUT TO ADAPT SEARCH RESULTS PROVIDED FOR PRESENTATION TO THE USER

(71) Applicant: Google Inc., Mountain View, CA (US)

(72) Inventors: David Kogan, Natick, MA (US); Bryan Horling, Belmont, MA (US)

(73) Assignee: GOOGLE LLC, Mountain View, CA (US)

( * ) Notice: Subject to any disclaimer, the term of this patent is extended or adjusted under 35 U.S.C. 154(b) by 255 days.

(21) Appl. No.: 15/252,031

(22) Filed: Aug. 30, 2016

(65) Prior Publication Data
US 2018/0060029 A1 Mar. 1, 2018

(51) Int. Cl.
G06F 3/16 (2006.01)
G06F 16/248 (2019.01)
G06F 16/28 (2019.01)
G06F 16/951 (2019.01)
G06F 3/0484 (2013.01)

(52) U.S. Cl.
CPC ............ *G06F 3/167* (2013.01); *G06F 3/0484* (2013.01); *G06F 16/248* (2019.01); *G06F 16/285* (2019.01); *G06F 16/951* (2019.01)

(58) Field of Classification Search
CPC .. G06F 3/167; G06F 3/0484; G06F 17/30554; G06F 17/30598; G06F 17/30648; G06F 17/30696; G06F 17/30864
USPC ........................................................ 715/727
See application file for complete search history.

(56) References Cited

U.S. PATENT DOCUMENTS 9,305,064 B1 * 4/2016 LeBeau ............. G06F 17/30755
2013/0111348 A1 * 5/2013 Gruber ................ G06F 17/3087
715/727
2013/0275164 A1 10/2013 Gruber et al.

OTHER PUBLICATIONS

European Patent Office—International Searching Authority; Notification of Transmittal of the International Search Report and the Written Opinion of PCT Serial No. PCT/US2017/046568; dated Nov. 21, 2017.

(Continued)

*Primary Examiner* — Anil N Kumar
(74) *Attorney, Agent, or Firm* — Middleton Reutlinger

(57) ABSTRACT

Methods, apparatus, and computer readable media related to interaction between a user and an automated assistant during a dialog between the user and the automated assistant. Some implementations are directed to adapting a graphical and/or audible presentation of search results provided by the automated assistant for presentation to the user. The adaptation may be in response to attribute(s), of one or more of the search results, referenced in spoken and/or typed textual input provided by the user during the dialog. Some of those implementations may enable a user to provide textual input to navigate the search results within the dialog and within resource and/or interface constraints associated with the dialog. Some of those implementations may additionally and/or alternatively enable adapting, based on textual input provided by a user to the automated assistant, when and/or whether search results having certain attributes are provided to the user by the automated assistant.

19 Claims, 12 Drawing Sheets

(56) References Cited

OTHER PUBLICATIONS

European Patent Office; Written Opinion of the International Preliminary Examining Authority of PCT Ser. No. PCT/US2017/046568; 7 pages; dated Jul. 10, 2018.
European Patent Office; International Preliminary Report on Patentability of PCT Ser. No. PCT/US2017/046568; 10 pages; dated Mar. 14, 2019.

* cited by examiner

USING USER INPUT TO ADAPT SEARCH RESULTS PROVIDED FOR PRESENTATION TO THE USER

BACKGROUND

Automated assistants (also known as "personal assistant modules", "mobile assistants", or "chat bots") may be interacted with by a user via a variety of computing devices, such as smart phones, tablet computers, wearable devices, automobile systems, standalone personal assistant devices, and so forth. The automated assistants receive textual input from the user (e.g., typed and/or spoken) and respond with responsive output (e.g., visual and/or audible).

Some user interactions with an automated assistant may solicit only a single response from the automated assistant. For example, textual inputs of "what time is it in London", "what is the Capital of Delaware", and "how many ounces are in a cup" may all solicit a single response from the automated assistant.

In contrast, other user interactions with an automated assistant may be more general and solicit that a group of responses be provided by the automated assistant. For example, "news headlines", "nearby restaurants", and "search results for mustang" may all solicit the automated assistant to issue a search of one or more corpora and return a group of search results that are responsive to the search.

However, resource and/or interface constraints associated with existing automated assistants may present one or more drawbacks in providing, by the automated assistant, a group of search results for presentation to a user. For example, some automated assistants may be implemented via a "chat" type graphical user interface. Simultaneous display of a large quantity of search results in such an interface may clutter the interface, make dialog harder to follow, and/or may consume a relatively large amount of computational resources. For instance, computational resources may be consumed as a result of simultaneously rendering the large quantity of results and/or as a result of "scrolling" and/or other actions that may be required to view the large quantity of results. Moreover, making the search results viewable in an interface and/or application that is separate from the automated assistant interface and/or application may consume greater user and/or computational resources. For instance, switching to the other interface and/or application may distract the user from ongoing dialog with the automated assistant and/or require that a computing device execute the separate application and/or render the separate interface.

As another example, some automated assistants may include (or be restricted to) providing audible user interface output and accepting spoken user interface input. When a group of search results are provided by such automated assistants, directed navigation of the group of results by the user via spoken user interface input may not be possible and/or may be limited. Moreover, many automated assistants may lack the ability to adapt, based on textual input provided by a user to the automated assistant, when and/or whether search results having certain attributes are provided to the user by the automated assistant. Additional and/or alternative drawbacks of these and/or other techniques may be presented.

SUMMARY

This specification is directed to methods, apparatus, and computer readable media related to interaction between a user and an automated assistant during a dialog between at least the user and the automated assistant. Some implementations are directed to adapting a graphical and/or audible presentation of search results provided by the automated assistant for presentation to a user. The search result may be adapted in response to attribute(s), of one or more of the search results, referenced in spoken and/or typed textual input provided by the user during the dialog. Some of those implementations may enable a user to provide textual input to navigate the search results within the dialog and within resource and/or interface constraints associated with the dialog. Some of those implementations may additionally or alternatively enable adapting, based on textual input provided by a user to the automated assistant, when and/or whether search results having certain attributes are provided to the user by the automated assistant.

Some of these and other implementations of the specification may achieve various technical advantages. For example, some implementations of adapting when and/or whether search results are provided to the user may enable fewer search results to be provided to the user in some situations, while still satisfying the informational needs of the user. This may reduce the use of various computational resources, such as resources of a computing device that are required for visually and/or audibly presenting the search results to the user. Also, for example, some implementations of navigating the search results within the dialog may enable a user to freely navigate (optionally non-sequentially) forward and/or backward through search results, without necessitating that all of the search results be presented simultaneously and/or that the entirety of one or more of the search results be presented. This may enable search results to be provided for presentation to a user, and navigated by the user, while also enabling: desired and/or necessary resource and/or interface constraints to be satisfied; and/or less than the entirety of one or more of the search results to be provided during the presentation of the search results.

As one example, a user may cause textual input to be provided to an automated assistant during a dialog between the user and the automated assistant. The textual input may initiate the dialog or may be a continuation of a previously initiated dialog. The textual input may be natural language free-form input, such as textual input that is based on user interface input generated by the user via one or more user interface input devices (e.g., based on typed input provided via a physical or virtual keyboard or based on spoken input provided via a microphone). As used herein, free-form input is input that is formulated by a user and that is not constrained to a group of options presented for selection by the user (e.g., not constrained to a group of options presented in a drop-down menu).

In response to some textual input provided to the automated assistant as part of a dialog, the automated assistant may obtain a plurality of responsive search results. For example, the automated assistant may cause a search of one or more databases to be issued based on the textual input (or may itself search the database(s)), and may obtain a plurality of search results in response to the search. For example, in response to textual input of "news headlines", a database of news story documents may be searched, and a plurality of search results obtained that are each based on a respective one of a plurality of recent news story documents identified in response to the search. The obtained search results may be selected and/or ranked based on various signals, such as popularity of the search results, a degree of matching between the search parameters and the search results, attributes of the user, etc.

Also, in some implementations the obtained search results may additionally or alternatively be selected and/or ranked based on past textual input provided by the user during dialog with the automated assistant. For example, search results from "Source 1" (e.g., a particular resource name of a URL or other indicator of a publisher and/or author) may be excluded from search results if: a user was previously presented with a search result from Source 1 during a dialog with the automated assistant, and the user provided responsive textual input of "no more from this source." As another example, search results from "Source 2" may be promoted in the ranking of search results if: a user was previously presented with a search result from Source 2 during a dialog with the automated assistant, and the user provided responsive textual input of "I like this source."

Regardless of the technique(s) for obtaining and/or ranking the search results, the automated assistant may sequentially provide groups of the search results for presentation (visual and/or audible) to the user as part of the dialog. The order in which the search results are provided for presentation may be based on the ranking. For example, a first group that includes only a highest ranked search result may be provided for presentation, then a second group that includes only the second highest ranked search result may be provided for presentation, etc. In some implementations, the second group is automatically provided following the first group (e.g., immediately following or after a time delay). In some implementations, a user interface input may be required before the second group is provided. For example, the second group may only be provided if the user provides particular spoken user interface input such as "next", "another", "continue", etc. during or after the providing of the first group.

In some implementations, during the providing of the search results the user may provide further textual input that "breaks" the order of the sequential providing and causes one or more "out of order" search results to instead be provided. For example, the user may speak or type: "previous" to go back to the immediately preceding search result; "second result" to go back to the search result presented second; "back to the one from Source A" to go back to the search result from "Source A"; "back to the one about Topic A" to go back to the search result about "Topic A"; "more from Source A" to move forward to another search result from "Source A" (even though it's not next in the sequential order); "more about Topic A" to move forward to another search result about "Topic A" (even though it's not next in the sequential order); and/or "more like this" to move forward to an additional search result that is similar to the search result that has most recently been presented at least in part (even though the additional search result is not next in the sequential order). These and other implementations are described in additional detail herein.

In some implementations, a method performed by one or more processors is provided that includes receiving input and obtaining a plurality of search results that are responsive to the input. The input is based on user interface input generated by a user via a user interface input device, and the user interface input is generated by the user as part of dialog between the user and an automated assistant implemented at least in part by one or more of the processors. The method further includes sequentially providing groups of the search results for presentation to the user via a user interface output device. Each of the groups of the search results includes at least one of the search results, and sequentially providing the groups of search results includes providing each of the groups according to an order of the groups. The method further includes receiving further input during the providing. The further input is based on further user interface input generated by the user via the user interface input device or another user interface input device. The method further includes determining, based on one or more terms of the further input and based on at least one attribute of a previously presented search result, that the further input corresponds to the previously presented search result. The previously presented search result is one of the search results that was previously provided during the sequentially providing. The method further includes, in response to determining that the further input corresponds to the previously presented search result, providing output related to the previously presented search result. The providing of the output is counter to the order of the groups.

These and other implementations of technology disclosed herein may optionally include one or more of the following features.

In some implementations, sequentially providing the groups of the search results for presentation to the user includes providing an initial group of the groups in response to the input and providing a second group following the initial group. The second group sequentially follows the initial group according to the order, providing the second group is in response to receiving additional user interface input, and the additional user interface input precedes the further user interface input. In some of those implementations, the additional user interface input is verbal user interface input.

In some implementations, the user interface input device is a microphone, the user interface output device is a speaker, and the further user interface input is generated by the user via the microphone. In some of those implementations, at least part of the further user interface input is received during audible presentation of one of the search results via the speaker.

In some implementations, the further user interface input is verbal user interface input, and the method further includes actively monitoring for the further input during the providing. In some of those implementations, receiving the further input occurs during the actively monitoring.

In some implementations, the user interface output device is a display, the output includes the previously presented search result, and providing the output includes: causing the output to be presented, in a graphical user interface presented on the display, separate and apart from any persistent output from the previous presentation of the previously presented search result.

In some implementations, the output is an additional search result that is related to the previously presented search result, but that is associated with a different underlying content item than the previously presented search result.

In some implementations, the user interface output device is a display and sequentially providing the groups for presentation to the user via the display includes: causing each of the groups to supplant, in a graphical user interface presented on the display, a corresponding immediately preceding group of the groups. In some of those implementations, providing the output related to the search result includes causing the output to supplant, in the graphical user interface, a most recently provided group of the groups provided during the sequentially providing.

In some implementations, determining, based on the one or more terms of the further input and based the attribute of the previously presented search result, that the further input corresponds to the previously presented search result includes: identifying the attribute of the previously presented search result, and determining that the one or more terms match the attribute. In some of those implementations, the attribute is one of: a name of a source of the previously presented search result, a name of an entity included in the previously presented search result, and a reference to a presentation order of the previously presented search result in the sequentially providing of the groups.

In some implementations, the method further includes determining, based on one or more of the terms of the further input, that the further input also corresponds to an additional previously presented search result, of the search results, that was previously provided during the sequentially providing. In some of those implementations, determining that the further input corresponds to the previously presented search result further includes selecting the previously presented search result instead of the additional previously presented search result based on one or more additional criteria. In some of those implementations, determining that the further input corresponds to the previously presented search result includes: generating a prompt based on an additional attribute of the additional previously presented search result; providing the prompt for presentation to the user via the user interface output device; receiving, responsive to the prompt, additional user interface input; and selecting the previously presented search result instead of the additional previously presented search result based on the additional user interface input.

In some implementations, the input and/or the further textual input comprise textual input, such as textual input generated based on verbal user interface input.

In some implementations, a method performed by one or more processors is provided that includes, as part of a dialog between a user and an automated assistant implemented at least in part by one or more of the processors: providing a search result for presentation to the user; in response to providing the search result, receiving textual input that references an attribute of the search result and a sentiment of the user for that attribute; determining, based on the attribute of the search result and the sentiment of the user for that attribute, a parameter that influences whether or when one or more attribute search results that have the attribute are provided by the automated assistant in response to further dialog between the user and the automated assistant; and as part of the further dialog between the user and the automated assistant: using, by the automated assistant, the parameter to influence whether or when at least one of the attribute search results is provided for presentation to the user.

These and other implementations of technology disclosed herein may optionally include one or more of the following features. In some implementations, the parameter either: influences when the attribute search results are provided as part of the further dialog by influencing a ranking of the attribute search results, or influences whether the attribute search results are provided as part of the further dialog by preventing the attribute search results from being provided. In some versions of those implementations, the parameter influences the ranking of the attribute search results to a degree that is based on the sentiment of the user for the attribute of the attribute search results. In some other versions of those implementations, the parameter prevents the attribute search results from being provided based on the sentiment of the user for the attribute being expressed in the textual input by one or more predefined terms.

In some implementations, the attribute of the search result is a source of the search result, the textual input includes a term that references the source and an additional term that references the sentiment, and the parameter influences a ranking of the attribute search results from the source, or prevents the attribute search results from the source from being provided for presentation to the user.

In some implementations, the reference to the attribute in the textual input is a reference to the search result without an explicit reference to the attribute. In some of those implementations, the method further includes identifying the attribute based on the attribute being assigned to the search result in one or more computer readable media. In some versions of those implementations, the attribute is one of: a source of the search result, an entity referenced in the search result, and a document type of the search result.

In some implementations, the search result is provided for presentation to the user in response to first textual input of the user, the further dialog is a continuance of the dialog and is a continuance of sequential presentation of search results responsive to the first textual input, and the at least one of the attribute search results is responsive to the first textual input.

In some implementations, the search result is provided for presentation to the user in response to first textual input of the user, the further dialog includes providing additional search results to the user in response to a new search issued for additional textual input of the user, and the at least one of the attribute search results is responsive to the additional textual input.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
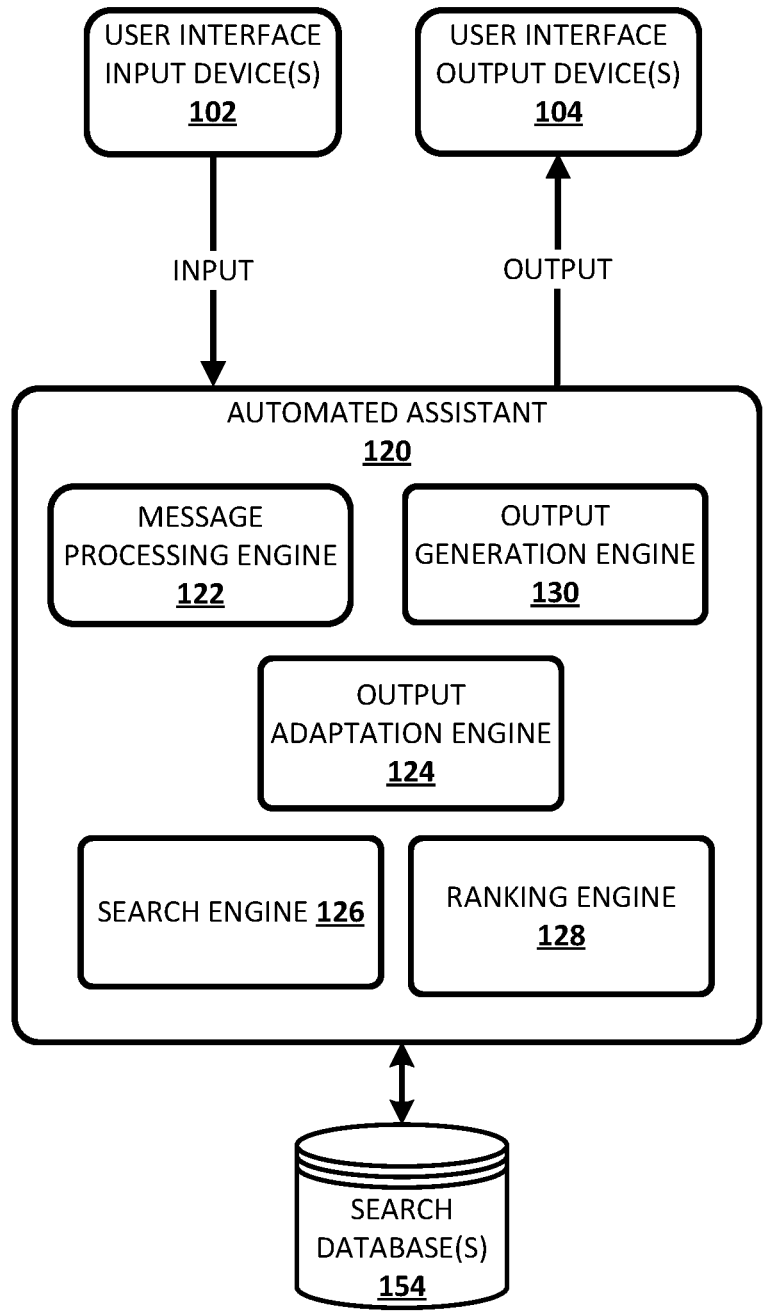
FIG. 1 is a block diagram of an example environment in which implementations disclosed herein may be implemented.

In FIG. 1, an example environment in which techniques disclosed herein may be implemented is illustrated. The example environment includes one or more user interface input devices 102, one or more user interface output devices 104, and an automated assistant 120. The user interface input devices 102 may include, for example, a physical keyboard, a touch screen (e.g., implementing a virtual keyboard or other textual input mechanism), and/or a microphone. The user interface output devices 104 may include, for example, a display screen, and/or speaker(s). The user interface input and output devices 102, 104 may be incorporated on one or more computing devices of a user. For example, a mobile phone of the user may include the user interface input and output devices 102, 104; or a standalone personal assistant hardware device may include the user interface input and output devices 102, 104; or a first computing device may include the user interface input device(s) 102 and a separate computing device may include the user interface output device(s) 104; etc.

Although automated assistant 120 is illustrated in FIG. 1 as separate from the user interface output and input devices 102, 104, in some implementations all or aspects of the automated assistant 120 may be implemented on a computing device that also contains the user interface input device (s) 102 and/or the user interface output device(s) 104. For example, all or aspects of output generation engine 130 and/or output adaptation engine 124 of automated assistant 120 may be implemented on the computing device. In some implementations, all or aspects of the automated assistant 120 may be implemented on computing device(s) that are separate and remote from a computing device that contains the user interface input devices 102 and/or the user interface output devices 104 (e.g., all or aspects may be implemented "in the cloud"). In some of those implementations, those aspects of automated assistant 120 may communicate with the computing device via one or more networks such as a local area network (LAN) and/or wide area network (WAN) (e.g., the Internet).

Some non-limiting examples of client computing device (s) that may include the user interface input device(s) 102 and/or user interface output device(s) 104 include one or more of: a desktop computing device, a laptop computing device, a standalone hardware device at least in part dedicated to automated assistance, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device, a virtual or augmented reality computing device). Additional and/or alternative client computing devices may be provided. In some implementations, a given user may communicate with all or aspects of automated assistant 120 utilizing a plurality of client computing devices that collectively form a coordinated "ecosystem" of computing devices. However, for the sake of brevity, some examples described in this disclosure will focus on the user operating a single client computing device.

A client computing device and automated assistant 120 may each (when they are separate devices) include one or more memories for storage of data and software applications, one or more processors for accessing data and executing applications, and other components that facilitate communication over a network. The operations performed by one or more of the client computing devices and/or by the automated assistant 120 may be distributed across multiple computing devices. Automated assistant 120 may be implemented as, for example, computer programs running on one or more computers in one or more locations that are coupled to each other through a network.

As illustrated in FIG. 1, a user provides input to the automated assistant 120 via the user interface input device(s) 102. The automated assistant 120 provides responsive output for presentation to the user via the user interface output devices(s) 104 (optionally after further processing by one or more components). For the sake of simplicity, the input is illustrated in FIG. 1 as being provided directly to the automated assistant 120 by the user interface input device(s) 102 and the output is illustrated as being provided by the automated assistant 120 directly to the user interface output device(s) 104. However, it is noted that in various implementations one or more intermediary hardware components may be functionally interposed between the automated assistant 120 and the user interface input and/or output devices 102, 104, and may optionally process the input and/or output. For example, one or more components may process the output provided by automated assistant 120 and generate, based on the processing of the output, one or more signals for presentation of search results and/or other content via the user interface output device(s) 104. For instance, where a user interface output device 104 is on a client computing device separate from all or aspects of the automated assistant 120, a hardware processor and/or other components may process the output and generate, based on the output, signals for driving the user interface output device 104.

In some implementations, the input received by the automated assistant 120 is already in a textual format. For example, the user interface input device(s) 102 may include a keyboard that generates textual input in response to user interface input directed to the keyboard, and the textual input provided to the automated assistant 120. Also, for example, the user interface input device(s) 102 may include a microphone, a voice-to-text processor that is separate from the automated assistant 120 may convert voice input received at the microphone into textual input, and the textual input may be provided to the automated assistant 120. In some other implementations, the input initially received by the automated assistant 120 is not in a textual format, but is converted to a textual format by the automated assistant 120 and provided in the textual format to one or more other components of the automated assistant 120. For instance, the user interface input device(s) 102 may include a microphone, voice input may be received at the microphone and provided to the automated assistant 120, and a voice-to-text processor of the automated assistant 120 may convert the voice input into textual input.

A client computing device may optionally operate one or more applications that enable dialog with the automated assistant 120. Such applications may come in various forms such as a short messaging service ("SMS") and/or multimedia messaging service ("MMS") client, an online chat client (e.g., instant messenger, Internet relay chat, or "IRC," etc.), a messaging application associated with a social network, an automated assistant messaging service dedicated to conversations with automated assistant 120, and so forth. In some implementations, one or more of the applications may be implemented via a webpage or other resources rendered by a web browser or other application of a client computing device.

In various implementations, in response to certain textual input provided to the automated assistant 120 during a dialog with the automated assistant 120, the automated assistant 120 may obtain a plurality of responsive search results using search parameters that are based at least in part on the textual input. The obtained search results may be selected and/or ranked based on various signals, such as popularity of the search results, a degree of matching between the search parameters and the search results, attributes of the user, etc. In some implementations, the obtained search results may additionally or alternatively be selected and/or ranked based on past textual input provided by the user during dialog with the automated assistant. For example, search results from "Source 1" may be excluded from search results to be provided for presentation to a user if: a user was previously presented with a search result from Source 1 during dialog with the automated assistant 120, and the user provided responsive textual input of "no more from this source."

The automated assistant 120 may then sequentially provide, as output for providing to the user via user interface output device(s) 104, groups of search results for presentation (visual and/or audible) to the user as part of the dialog. The automated assistant 120 may sequentially provide the groups of search results in an order that is based on the ranking of the search results. In some implementations, each of the provided groups may include only a single search result. In some other implementations, one or more of the provided groups may include multiple search results (e.g., each group may include two search results).

In some implementations, during the providing of the search results by the automated assistant 120, the user may provide further textual input that "breaks" the order of the sequential providing by the automated assistant 120 and causes one or more "out of order" search results to instead be provided by the automated assistant 120. For example, the user may speak or type: "previous" to go back to the immediately preceding search result; "second result" to go back to the search result presented second; "back to the one from Source A" to go back to the search result from "Source A"; "back to the one about Topic A" to go back to the search result about "Topic A"; "more from Source A" to move forward to another search result from "Source A" (even though it's not next in the sequential order), and/or "more about Topic A" to move forward to another search result about "Topic A" (even though it's not next in the sequential order).

In various implementations, automated assistant 120 may include a message processing engine 122, an output adaptation engine 124, a search engine 126, a ranking engine 128, and an output generation engine 130. In some implementations, one or more of engines 122, 124, 126, 128, and/or 130 may be omitted, combined, and/or implemented in a component that is separate from automated assistant 120. For example, one or more of engines 122, 124, 126, 128, and/or 130, or any operative portion thereof, may be implemented in a component that is executed by a client computing device that includes the user interface input and/or output devices 102 and 104 and that is separate from the automated assistant 120. Also, for example, the search engine 126 and/or the ranking engine 128 may be implemented in whole or in part by a system that is separate from the automated assistant 120 (e.g., a separate search system in communication with the automated assistant 120).

Message processing engine 122 processes textual input that is submitted to the automated assistant 120 and generates annotated output for use by one or more other components of the automated assistant 120. For example, the message processing engine 122 may process natural language free-form textual input that is generated based on user interface input generated by a user via user interface input device(s) 102. The generated annotated output includes one or more annotations of the textual input and optionally one or more (e.g., all) of the terms of the textual input.

In some implementations, the message processing engine 122 is configured to identify and annotate various types of grammatical information in textual input. For example, the message processing engine 122 may include a part of speech tagger configured to annotate terms with their grammatical roles. For example, the part of speech tagger may tag each term with its part of speech such as "noun," "verb," "adjective," "pronoun," etc. Also, for example, in some implementations the message processing engine 122 may additionally and/or alternatively include a dependency parser configured to determine syntactic relationships between terms in textual input. For example, the dependency parser may determine which terms modify other terms, subjects and verbs of sentences, and so forth (e.g., a parse tree)—and may make annotations of such dependencies.

In some implementations, the message processing engine 122 may additionally and/or alternatively include an entity tagger configured to annotate entity references in one or more segments such as references to people, organizations, locations, and so forth. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the message processing engine 122 may additionally and/or alternatively include a coreference resolver configured to group, or "cluster," references to the same entity based on one or more contextual cues. For example, the coreference resolver may be utilized to resolve the term "it" to "Source 1" in the natural language input "I hate Source 1. No more results from it."

In some implementations, the message processing engine 122 may additionally and/or alternatively determine a sentiment, and optionally a sentiment magnitude, of one or more segments of textual input. The sentiment of a segment may be determined based on term(s) of the segment, other term(s) of the textual input, and/or data that is in addition to the textual input itself (e.g., voice characteristics included in voice input on which the textual input is based, preceding textual input, and/or other data). In some implementations, the message processing engine 122 includes a trained sentiment classifier trained to predict, based on a segment of textual input and/or other data, a class/direction of sentiment of the segment and optionally a magnitude of the sentiment. For example, the sentiment classifier may predict whether a segment is positive or negative, and optionally a magnitude of the positivity/negativity, based on term(s) of the segment and optionally based on other data. In some implementations, the message processing engine 122 additionally and/or alternatively utilizes a mapping between terms and sentiments (and optionally sentiment magnitudes) to determine sentiment of a segment. For example, the mapping may define that: a segment that includes "never" has negative sentiment of a strong magnitude; "I'm not a fan of" has negative sentiment of a lesser magnitude; "always" has positive sentiment of a strong magnitude; "I like" has positive sentiment of a lesser magnitude; etc.

In some implementations, one or more components of the message processing engine 122 may rely on annotations from one or more other components of the message processing engine 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing particular textual input, one or more components of the message processing engine 122 may use related prior input and/or other related data outside of the particular textual input to determine one or more annotations. For example, a first textual input of a user in a dialog with the automated assistant 120 may be "Is that result from source 1?" and a subsequent textual input of the user may be "never provide results from them". In processing "never provide results from them", the coreference resolver may resolve "them" to "source 1" utilizing the prior input of "Is that result from source 1".

The search engine 126 searches one or more search databases 154 in response to at least some textual input submitted by a user as part of the dialog between the automated assistant 120 and the user. The search engine 126 searches the search databases 154 to identify content that is responsive to the textual input. In some implementations, the search databases 154 include database(s) that index publicly available content and/or database(s) that index content that is private to the user. The search engine 126 may utilize the databases 154 to identify responsive content and may generate search results based on the identified responsive content. In some implementations, one or more of the search databases 154 may be remote from the automated assistant 120 and/or any separate client computing device, and/or one or more of the search databases 154 may be local to the automated assistant 120 and/or any separate client computing device. In this specification, the term "database" is used to refer to any collection of structured or unstructured data stored in one or more computer readable media.

The search engine 126 may utilize various techniques in searching the search databases 154 in response to textual input, such as conventional and/or other information retrieval techniques. In some implementations, the search engine 126 may search one or more of the databases 154 based on search parameter(s) that conform strictly to the textual input. For example, for textual input of "mustangs", the only search parameter may be the term "mustangs". In some implementations, the search engine 126 may search one or more of the databases 154 based on one or more search parameters that are based on, but that do not necessarily conform strictly to, the textual input. For example, for textual input of "local news", the search engine 126 may search one or more of the databases 154 based on a search parameter that restricts the databases 154 to "news" databases and/or content to "news" content, and based on a search parameter that restricts content to content that is local to a user. As another example, for textual input of "restaurants nearby", the search engine 126 may search one or more of the databases 154 based on a search parameter that restricts the databases 154 to "points of interests" databases and/or content to "restaurant" content, and based on a search parameter that restricts content to content that is within a threshold distance of a current location of the user. As yet another example, for textual input of "my photos", the search engine 126 may search one or more of the databases 154 based on a search parameter that restricts the databases 154 to databases that are personal to the user and/or content to "image" content.

The ranking engine 128 calculates scores for the content identified by search engine 126 using one or more ranking signals, such as popularity of the content, a degree of matching between the search parameters and the content, attributes of the user (e.g., a location of the user, a primary language of the user), etc. The ranking engine 128 then ranks the responsive content using the scores.

The search engine 126 uses the identified responsive content ranked by the ranking engine 128 to generate search results. The search results include search results corresponding to the content that is responsive to the search issued based on the textual input. For example, each of the search results can include a title or other synopsis of a responsive content item, a summary of the content item, a link to the responsive content item, other information related to the responsive content item, and/or even the entirety of the content item. As one example, the summary of a news story content item may include a particular "snippet" or section of the news story. Also, for example, for a search result associated with an image, the search result may include a reduced size display of the image, a title associated with the image, and/or a link to the image. Also, for example, for a search result associated with a video, the search result may include an image from the video, a segment of the video, a title of the video, and/or a link to the video.

As described herein, in some implementations content may be identified and/or ranked based on past textual input provided by the user during dialog with the automated assistant 120. For example, the search engine 126 may search the search databases 154 based on parameter(s) determined based on past textual input and/or the ranking engine 128 may rank content based on parameter(s) determined based on past textual input. For example, in ranking content identified by the search engine 126, ranking engine 128 may filter out any content items about "Topic A" if a user was previously presented with a search result about Topic A, and the user provided responsive textual input of "never provide results about this topic." As another example, in ranking content, ranking engine 128 may promote content items from "Source 2" if a user was previously presented with a search result from Source 2, and the user provided responsive textual input of "I like this source."

The ranked search results generated by the search engine 126 and the ranking engine 128 are provided by the output generation engine 130 for presentation to the user via the user interface output device(s) 104. For example, the output generation engine 130 may provide the search results for audible and/or visual presentation via the user interface output device(s) 104 and may provide the search results as part of the dialog between the user and the automated assistant 120.

In some implementations, the output generation engine 130 sequentially provides groups of search results for presentation to the user as part of the dialog, and the order in which the search results are provided may be based on the ranking of the search results. For example, the output generation engine 130 may provide a first group that includes only a highest ranked search result, then a second group that includes only the second highest ranked search result, then a third group that includes the third highest ranked search result, etc. In some implementations, the output generation engine 130 automatically provides the second group of search results following the first group (e.g., immediately following or after a time delay), automatically provides the third group following the second group, etc. In some implementations, the output generation engine 130 awaits a further user interface input before providing the second group, then awaits a further user interface input before providing the third group, etc. For example, in some of those implementations the output generation engine 130 may only provide the second group if the user provides spoken user interface input such as "next", "another", etc. during or after the providing of the first group. Other user interface inputs may be utilized to cause the output generation engine 130 to sequentially progress through groups of search results.

The output adaptation engine 124 adapts the providing of the search results by the output generation engine 130 in response to certain further textual input of the user. In some implementations, the output adaptation engine 124 may break the order of the sequential providing of the search results by the output generation engine 130 in response to certain further textual input. For example, the output adaptation engine 124 may determine that at least one term of the further textual input includes an attribute of one or more search results that are not included in the next group to be provided based on the order. Based at least in part on the determination, the output adaptation engine 124 may provide one or more of the search results having the attribute, and provide the search result(s) in lieu of the next group to be provided based on the order.

To illustrate some examples, assume the output generation engine 130 provided Search Result A, then provided Search Result B, is providing Search Result C, and is slated to provide Search Result D following Search Result C. In response to textual input of "back to the first result" provided prior to the providing of Search Result D, the output adaptation engine 124 may cause the output generation engine 130 to again provide Search Result A in lieu of Search Result D. This may be based on determining that the term "back" references a previously presented search result and based on determining that the term "first result" matches an attribute of previously presented Search Result A (the attribute of being the search result provided first by output generation engine 130). In response to textual input of "back to the search result about Topic A" provided prior to the providing of Search Result D, the output adaptation engine 124 may cause the output generation engine 130 to again provide Search Result B in lieu of Search Result D. This may be based on determining that the term "back" references a previously presented search result and based on determining that previously presented Search Result B is related to "Topic A" (and that Search Results A and C are not related to Topic A and/or are less strongly related to Topic A). Determining that a search result is related to a topic, related to an entity, is from a particular source, and/or has other attribute(s) may be based on those attributes being assigned to the search result and/or underlying content in search database(s) 154 and/or in other database(s).

In response to textual input of "more results like this one" provided prior to the providing of Search Result D, the output adaptation engine 124 may cause the output generation engine 130 to provide a yet to be presented Search Result X in lieu of Search Result D. This may be based on determining that "more" has a positive sentiment (e.g., based on an annotation of message processing engine 122), that "like this one" references attribute(s) of the previously presented (at least in part) Search Result C, and that one or more attributes of Search Result C are more similar to attributes of Search Result X than they are to attributes of Search Result D. In response to textual input of "I don't like this source" provided prior to the providing of Search Result D, the output adaptation engine 124 may cause the output generation engine 130 to provide a yet to be presented Search Result Y in lieu of Search Result D. This may be based on determining that "don't like" has a negative sentiment (e.g., based on an annotation of message processing engine 122), that "this source" references a source attribute of the previously presented (at least in part) Search Result C, and that Search Result D has the same source attribute as Search Result C, whereas a next in the order Search Result Y does not have the same source attribute as Search Result C. In implementations of the various examples provided, the output adaptation engine 124 may rely on one or more annotations provided by message processing engine 122 and may utilize various techniques for semantic understanding of textual segments such as rules-based techniques, template-based techniques, machine learning models (e.g., deep neural networks), and/or other techniques.

In some implementations, the output adaptation engine 124 additionally and/or alternatively utilizes expressed sentiments for attributes to modify the identification and/or ranking of search results for downstream searches based on downstream textual input in dialog between the user and the automated assistant 120. For example, the textual input above of "I don't like this source" may be used to demote the ranking of downstream search results that have the same source attribute as Search Result C.

Figure 2:
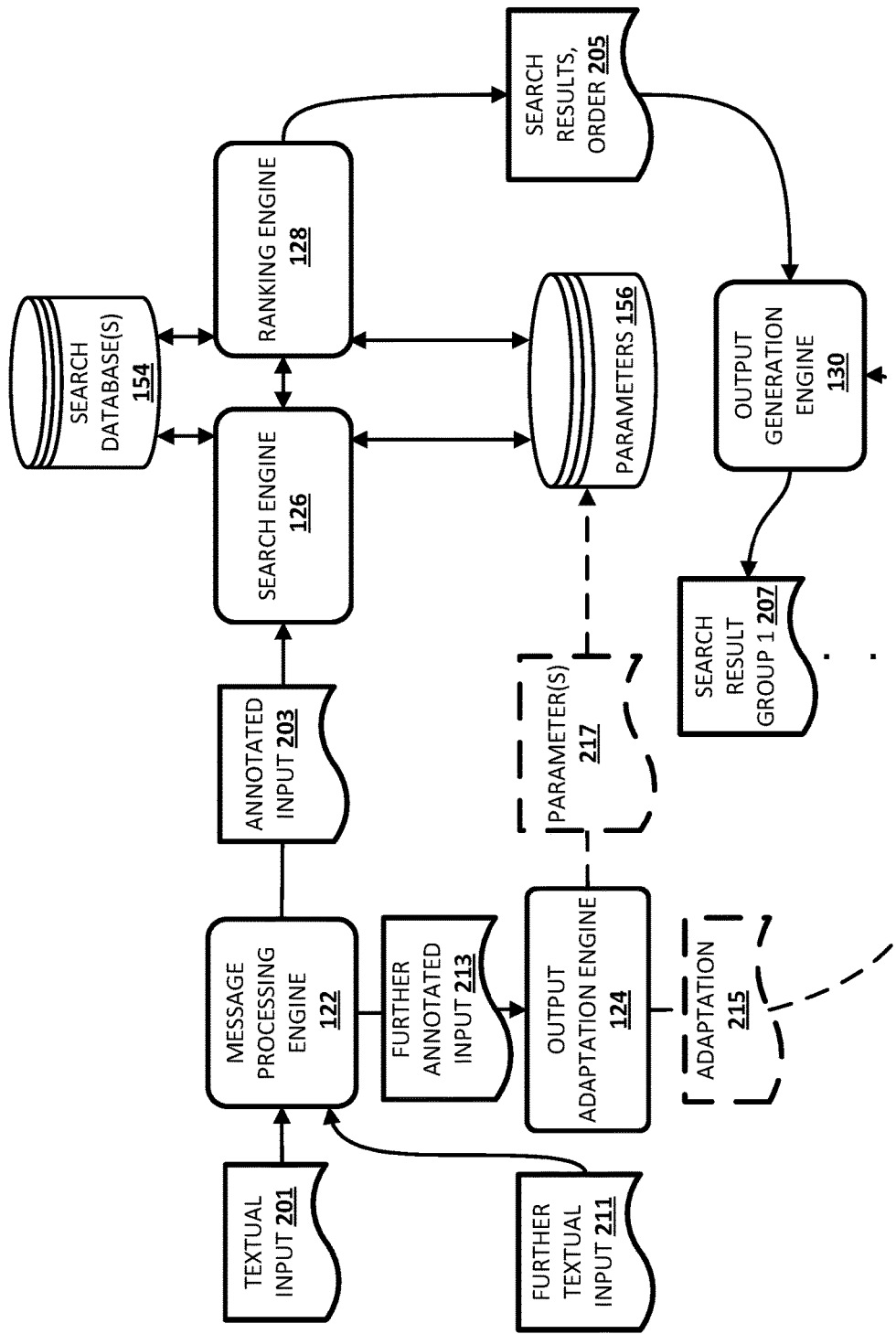
FIG. 2 illustrates an example of adapting search results provided to a user by an automated assistant during a dialog, where the search results are adapted in response to attribute(s), of one or more of the search results, referenced in spoken and/or typed textual input provided by the user during the dialog.

Turning now to FIG. 2, additional description is provided of various components of automated assistant 120. In FIG. 2, the message processing engine 122 receives textual input 201, generates annotated input 203 that includes annotations of the textual input and/or terms of textual input 201 itself. The search engine 126 utilizes the annotated input 203 to determine search parameters, issues a search of one or more of the search databases 154 based on the search parameters, and identifies content that is responsive to the search. The ranking engine 128 ranks the responsive content utilizing one or more signals. For example, the ranking engine 128 may rank responsive content based on popularity of the responsive content (e.g., as indicated by entries for the content in search database(s) 154) and/or based on one or more parameters of parameters database 156. As described herein, one or more parameters of parameters database 156 may be determined based on past textual input provided in a dialog with a user. A given parameter may define an attribute and how to influence search results having that attribute. For instance, the parameter may define an attribute and define how search results having that attribute should be promoted or demoted in ranking of search results, or that search results having that attribute should be prevented from being included in search results provided for presentation to a user.

The ranking engine 128 provides search results and an order of the search results 205 to the output generation engine 122. The search results are based on the content identified by search engine 126 and the order of the search results may be based on the ranking determined by the ranking engine 128.

The output generation engine 130 begins sequentially providing the search results based on the order. For example, as illustrated in FIG. 2, the output generation engine 130 provides search result group 1 207 and optionally further search result groups as indicated by the ellipsis.

At some point during the sequential providing of the search results by output generation engine 130, the message processing engine 122 receives a further textual input 211. The message processing engine 122 may determine the further textual input 211 relates to adaptation of the presentation of the search results and, as a result, provide further annotated input 213 to output adaptation engine 124. The further annotated input 213 may include annotations of the further textual input 211 and/or one or more terms of the further textual input 211.

In some implementations, based on the further annotated input 213, the output adaptation engine 124 determines an adaptation 215 to be made to the sequential providing of the search results and communicates the adaptation 215 to the output generation engine 130. The output generation engine 130 may adapt the current sequential providing of the search results based on the adaptation 215. For example, instead of providing a next search result in the current sequential providing, the output generation engine 130 may instead provide an out of order search result based on the adaptation 215.

In some implementations, based on the further annotated input 213, the output adaptation engine 124 additionally or alternatively determines parameter(s) 217 for storing in parameters database 156. These stored parameter(s) 217 may be used to modify further downstream searching and/or ranking by the engines 126 and/or 128 in response to new searches based on new textual input. It is noted that in some implementation the output adaptation engine 124 may both provide both the adaptation 215 and the parameter(s) 217. For example, for further textual input 211 of "I never want results from Source A": the adaptation 215 may be provided and cause a search result that is from Source A and that is slated to be provided by the output generation engine 130 to no longer be provided; and the parameter 217 may be stored and may prevent further search results from Source A from being provided in response to new searches that are based on new textual input.

Referring now to FIGS. 3-7, various examples of implementations of the automated assistant 120 are described. FIGS. 3, 4A-4E, 6, and 7 each illustrate a computing device 110 with a display screen 140 displaying examples of dialog that may occur between a user of the computing device 110 and the automated assistant 120 according to implementations disclosed herein. One or more aspects of the automated assistant 120 may be implemented on the computing device 110 and/or on one or more computing devices that are in network communication with the computing device 110.

The display screen 140 of FIGS. 3, 4A-4E, 6, and 7 further includes a textual reply interface element 188 that the user may select to generate user interface input via a virtual keyboard and a voice reply interface element 189 that the user may select to generate user interface input via a microphone. In some implementations, the user may generate user interface input via the microphone without selection of the voice reply interface element 189. For example, during the dialog, active monitoring for audible user interface input via the microphone may occur to obviate the need for the user to select the voice reply interface element 189. In some of those and/or in other implementations, the voice reply interface element 189 may be omitted. Moreover, in some implementations, the textual reply interface element 188 may additionally and/or alternatively be omitted (e.g., the user may only provide audible user interface input). The display screen 140 of FIGS. 3, 4A-4E, 6, and 7 also includes system interface elements 181, 182, 183 that may be interacted with by the user to cause the computing device 110 to perform one or more actions.

Figure 5:
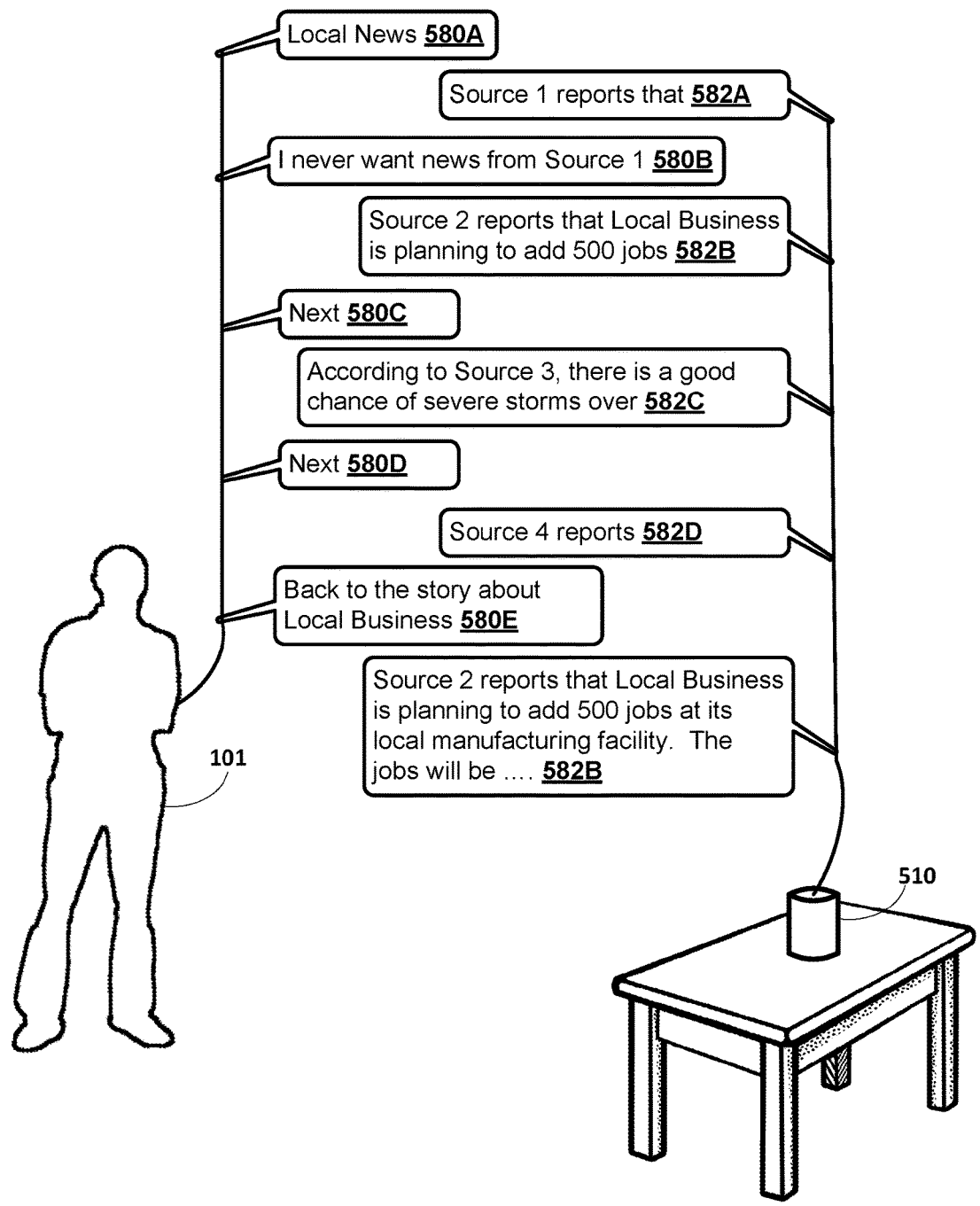
FIG. 5 illustrates another example client computing device, and an example of audible dialog that may occur between a user of the client computing device and an automated assistant according to implementations disclosed herein.

FIG. 5 illustrates a computing device 110 that includes one or more microphones and one or more speakers and illustrates examples of dialog that may occur, via the microphone(s) and speaker(s), between a user 101 of the computing device 510 and the automated assistant 120 according to implementations described herein. One or more aspects of the automated assistant 120 may be implemented on the computing device 510 and/or on one or more computing devices that are in network communication with the computing device 510.

Figure 3:
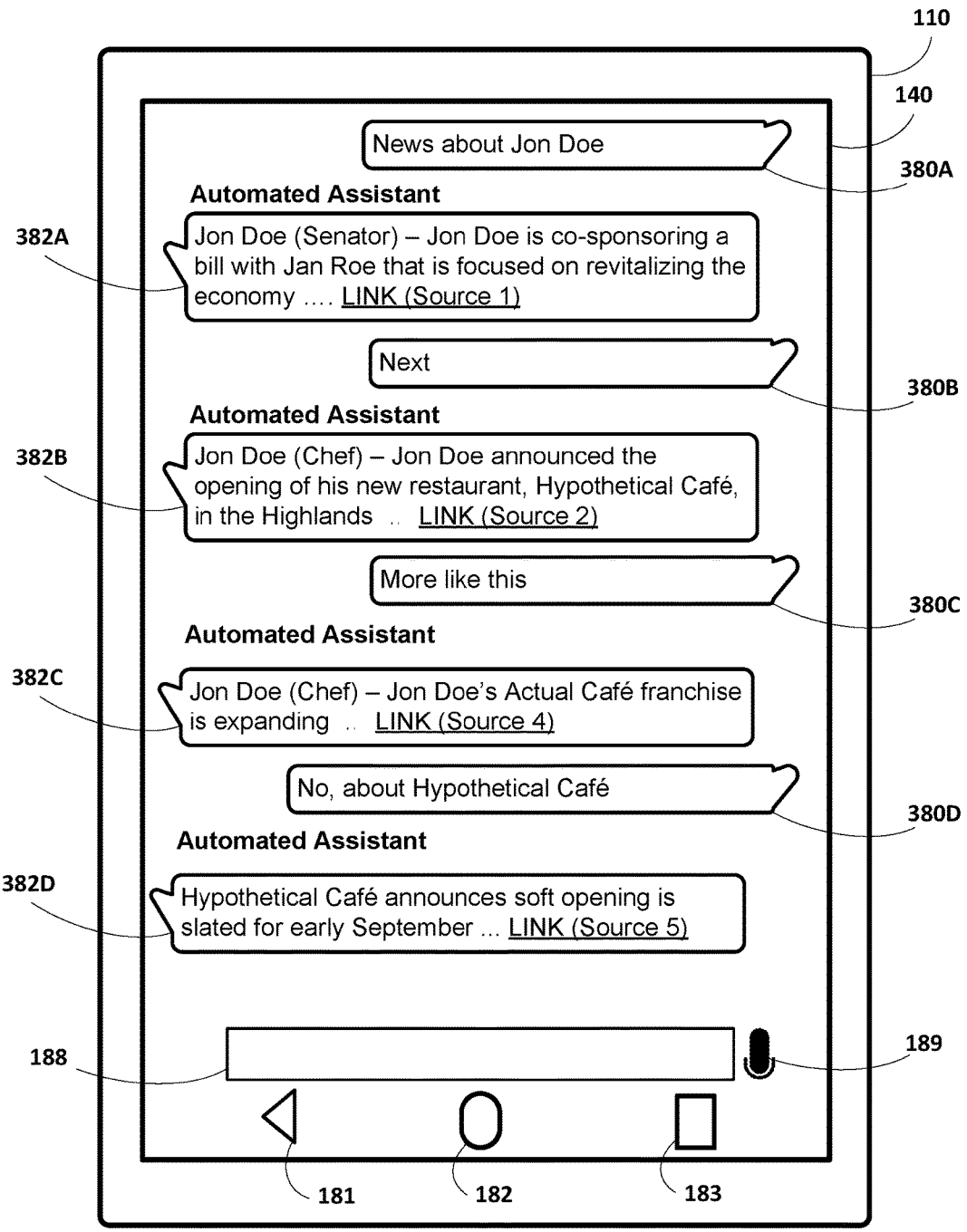
FIG. 3 illustrates an example client computing device with a display screen displaying an example of dialog that may occur between a user of the client computing device and an automated assistant according to implementations disclosed herein.

In FIG. 3, the user provides initial textual input 380A as part of a dialog between the user and the automated assistant 120. In response to the textual input 380A, the automated assistant 120 obtains search results that are responsive to the textual input 380A and provides a search result 382A for presentation on the display screen 140 as part of a transcript of the dialog. The automated assistant 120 provides the search result 382A for presentation first based on it being first in an order of presentation of the search results (e.g., based on a ranking of the search results). The user then provides textual input 380B of "next" to cause the automated assistant 120 to provide the search result 382B for presentation. The search result 382B is the next search result according to the order.

The user then provides textual input 380C of "More like this". The automated assistant 120 determines that "like this" references the most recently presented search result 382B. The automated assistant 120 further determines one or more attributes of the most recently presented search result 382B, such as attributes of: the search result being associated with a first entity corresponding to the fictional chef Jon Doe; and the search result being associated with a second entity corresponding to the fictional restaurant Hypothetical Café. The automated assistant 120 further determines that, like search result 382B, search result 382C also has an attribute of being associated with the first entity corresponding to the fictional chef Jon Doe. Based on that determination, the automated assistant 120 provides the search result 382C for presentation in response to the textual input 380C. In some implementations, search result 382C may not be the sequentially next search result according to the original order. However, based on the textual input 380C, the automated assistant 120 may provide the search result 382C in lieu of the next search result that was slated to be provided according to the original order. In other words, the textual input 380C may cause the automated assistant 120 to adapt the original order of presentation of the search results so that one or more search results that are similar to search result 382B are promoted in the order.

The user then provides textual input 380D of "No, about Hypothetical Café". The automated assistant 120 determines, based on textual inputs 380C and 380D, that "No, about Hypothetical Café" references that the user wants more search results about the fictional restaurant Hypothetical Café and not about the fictional chef Jon Doe. The automated assistant 120 further determines that search result 382D has an attribute of being associated with the entity corresponding to the fictional restaurant Hypothetical Café, and provides the search result 382D for presentation next based on that determination. In some implementations, search result 382D may not be the next search result according to the order as modified by textual input 380C. However, based on the textual input 380D, the automated assistant 120 may provide search result 382 instead of the next search result slated to be provided according to the modified order. In other words, the textual input 380D may cause the automated assistant 120 to further adapt the modified order of presentation of the search results so that one or more search results that relate to "Hypothetical Café" are promoted in the order.

It is noted that in some implementations, in response to textual input 380C, the automated assistant 120 may have identified multiple search results that share one or more attributes with search result 382B, and may have selected the search result 382C instead of those other search results based on one or more factors. For example, the automated assistant 120 may determine that the entity corresponding to the fictional chef Jon Doe has a greater weight for (e.g., is more strongly associated with) search result 382B than does the entity corresponding to the fictional restaurant Hypothetical Café. Search result 382C may have been initially selected in lieu of search result 382D and/or other search results based on search result 382C also being strongly associated with the entity corresponding to the fictional chef Jon Doe.

In some implementations, the automated assistant 120 may optionally generate a prompt in response to textual input 380C that solicits input for disambiguating "like this." For example, the automated assistant 120 may identify one or more attributes of the search result 382B and formulate a prompt that asks the user to specify which attribute(s) the user means by "like this". For instance, the automated assistant 120 may determine that the search result 382B is associated with a source attribute of "Source 2" and associated with entity attributes of "Jon Doe (Chef)" and "Hypothetical Café". Based on this determination, the prompt may be "do you want more from Source 2, more about the chef, or more about Hypothetical Café?". Further textual input provided in response to the prompt may be used by the automated assistant to select appropriate further search result(s) to provide. For instance, further textual input of "about Hypothetical Café" may lead to search result 382D initially being provided in lieu of search result 382C.

Figure 4A:
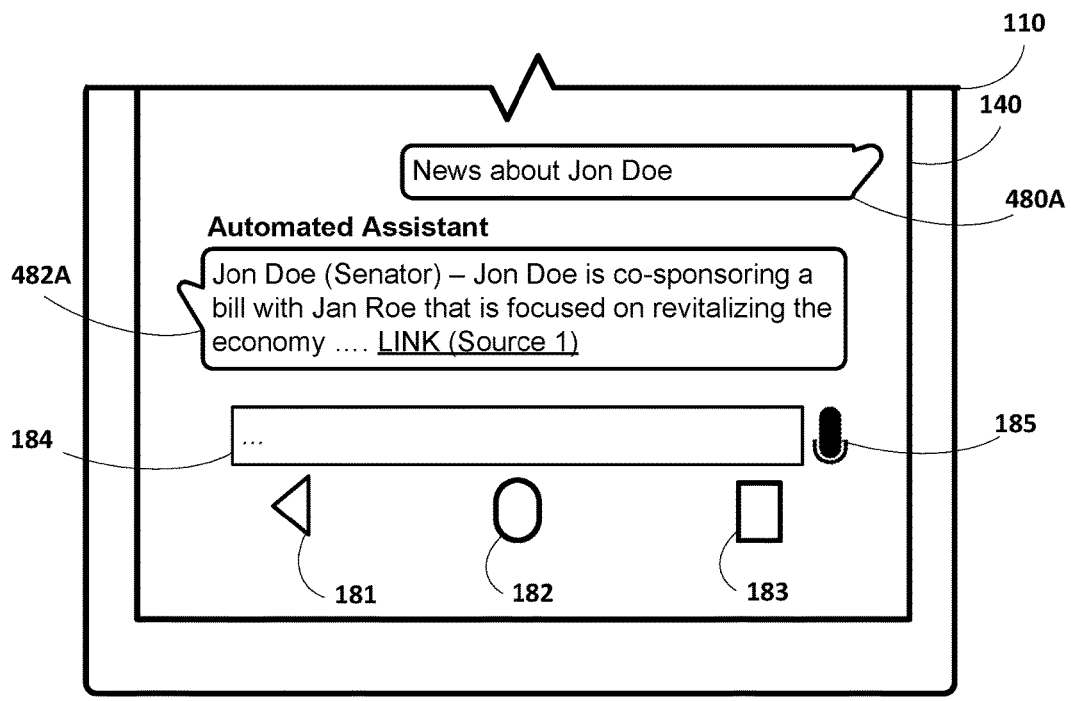
FIGS. 4A, 4B, 4C, and 4D illustrate the example client computing device of FIG. 3, with part of a display screen displaying another example of dialog that may occur between a user of the client computing device and an automated assistant according to implementations disclosed herein.

In FIG. 4A, the user provides initial textual input 480A as part of a dialog between the user and the automated assistant 120. In response to the textual input 480A, the automated assistant 120 obtains search results that are responsive to the textual input 480A and provides a search result 482A for presentation on the display screen as part of the dialog. The automated assistant 120 provides the search result 482A first based on it being first in an order of presentation of the search results (e.g., based on a ranking of the search results).

Figure 4B:
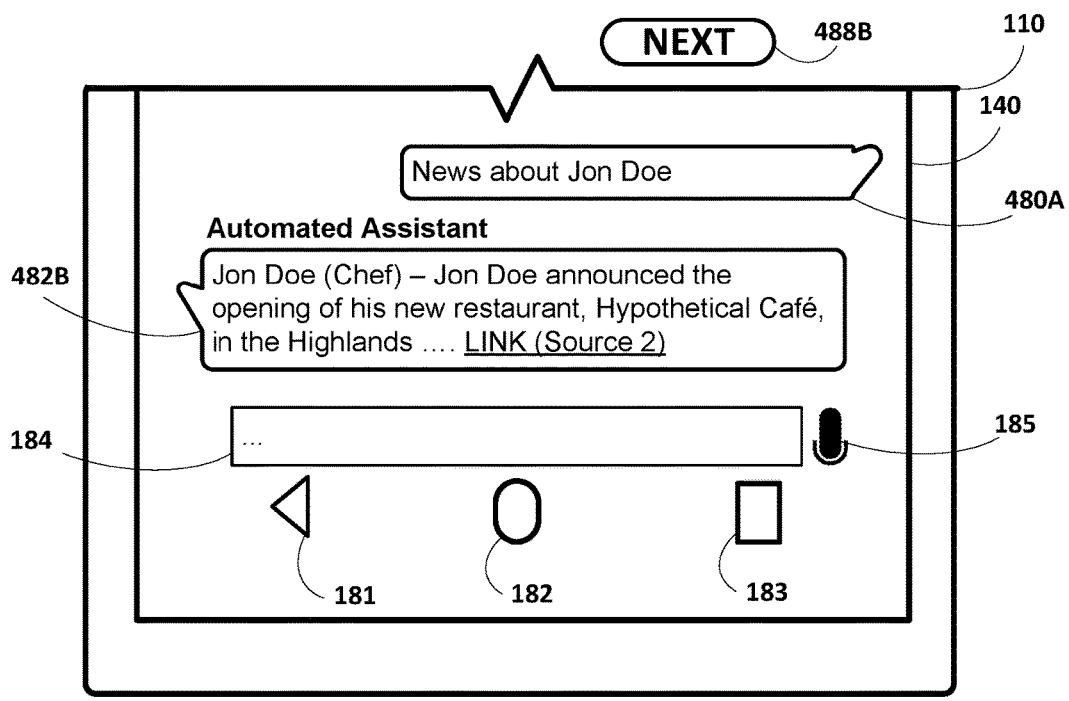

After the search result 482A is displayed to the user, the user then provides textual input 488B of "next" as illustrated in FIG. 4B. In response, the automated assistant 120 provides output that causes the search result 482A to be supplanted with the second search result 482B as illustrated in FIG. 4B. The search result 482B is the next search result according to the order. The textual input 488B of FIG. 4B may be provided by typing (e.g., by selecting interface area 184) or by voice (e.g., by selecting microphone interface element 185—or just by speaking without necessarily selecting element 185 (i.e., the automated assistant may monitor for voice input during the providing)).

It is noted that textual input 480A is the same as textual input 380A, search result 482A is the same as search result 382A, textual input 488B is the same as textual input 380B, and search result 482B is the same as search result 382B. However, in FIG. 3 the textual input 380B is added to the transcript of the dialog rendered in the graphical interface and persists in the transcript. In contrast, the textual input 488B of FIG. 4B is part of the dialog, but is not added to the transcript of the dialog rendered by the graphical interface. Also, in FIG. 3 the search result 382A persists in the transcript after search result 382B is provided, whereas in FIG. 4B the search result 482B supplants the search result 482A thereby removing it from the transcript. In other words, the search result 482B replaces the search result 482A thereby preventing simultaneous display of both search result 482A and search result 482B. In some implementations, technique(s) described with respect to FIGS. 4A-4E may be beneficial, for example, for display screens of a limited size and/or for interfaces where it may be distracting and/or computationally burdensome to maintain a full transcript of the dialog.

Figure 4C:
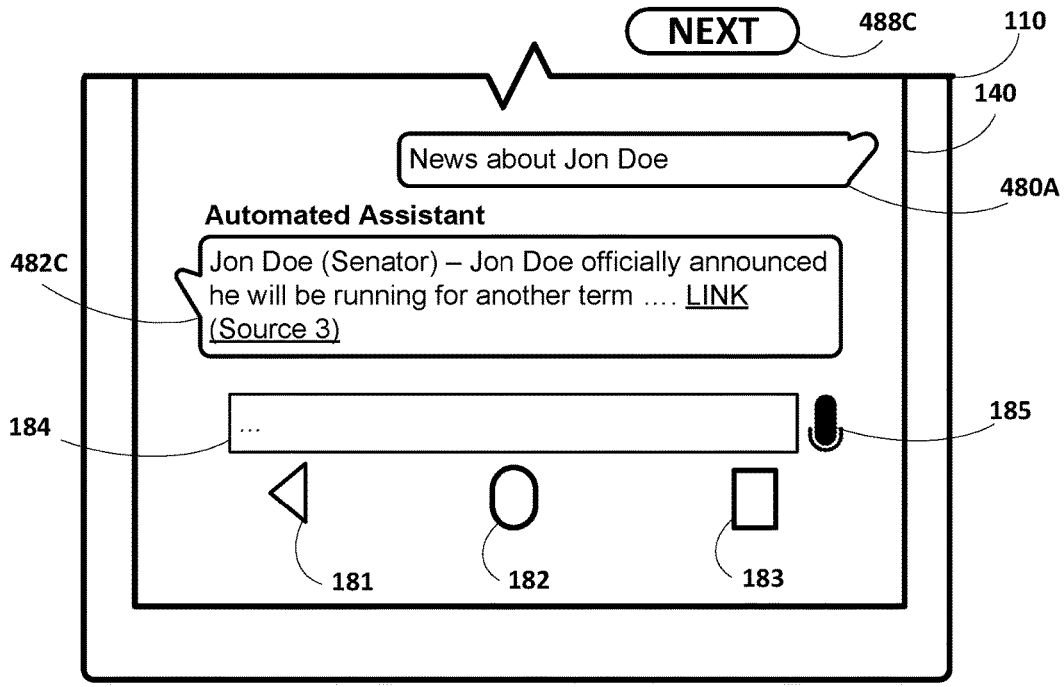

After the search result 482B is displayed to the user, the user then provides textual input 488C of "next" as illustrated in FIG. 4C. In response, the automated assistant 120 provides output that causes the search result 482B to be supplanted with the search result 482C as illustrated in FIG. 4C. The search result 482C is the next search result according to the order.

After the search result 482C is displayed to the user, the user then provides textual input 488D of "back to the one from source 1". The automated assistant 120 may determine that "back" references a previously presented search result and that "source 1" is an attribute of the previously presented search result 482A. In response, the automated assistant 120 causes search result 482C to be supplanted with expanded search result 482D. Expanded search result 482D includes the same content as search result 482A, but also includes some additional text from the underlying content item. From FIG. 4D, the user may optionally further navigate the search results (e.g., "Ok, now to search result 5") or may select (e.g., an audible selection or a "touch selection") the link associated with expanded search result 482D to view the full underlying content item associated with the expanded search result 482D. Viewing of the full underlying content item may optionally occur in a separate interface and/or a separate application.

Figure 4D:
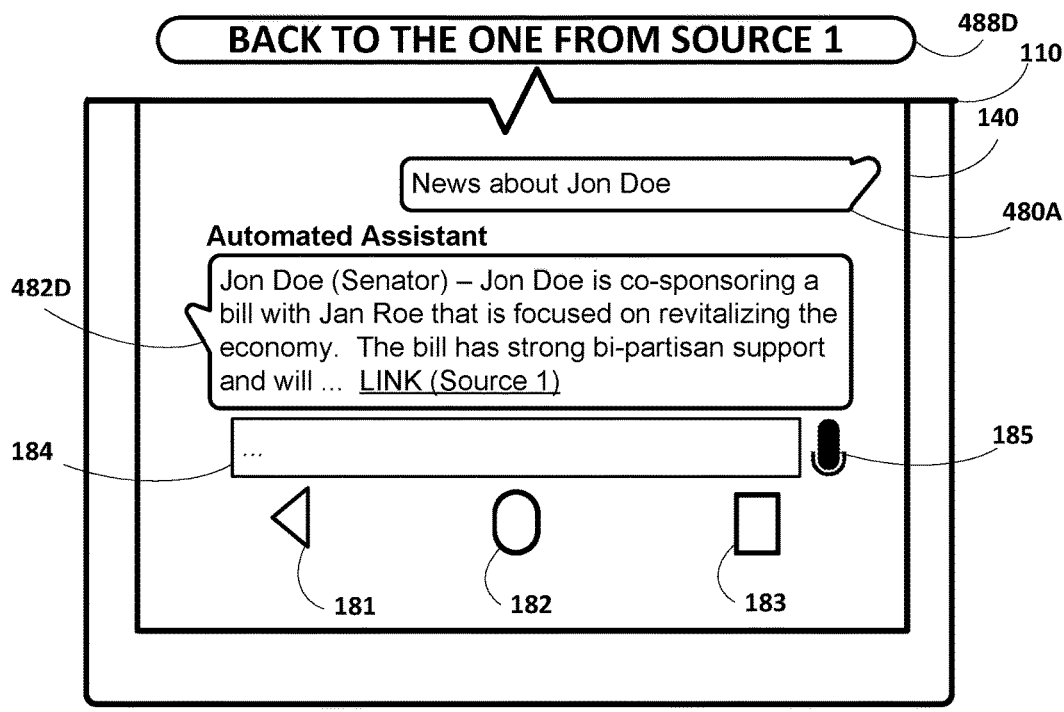
Figure 4E:
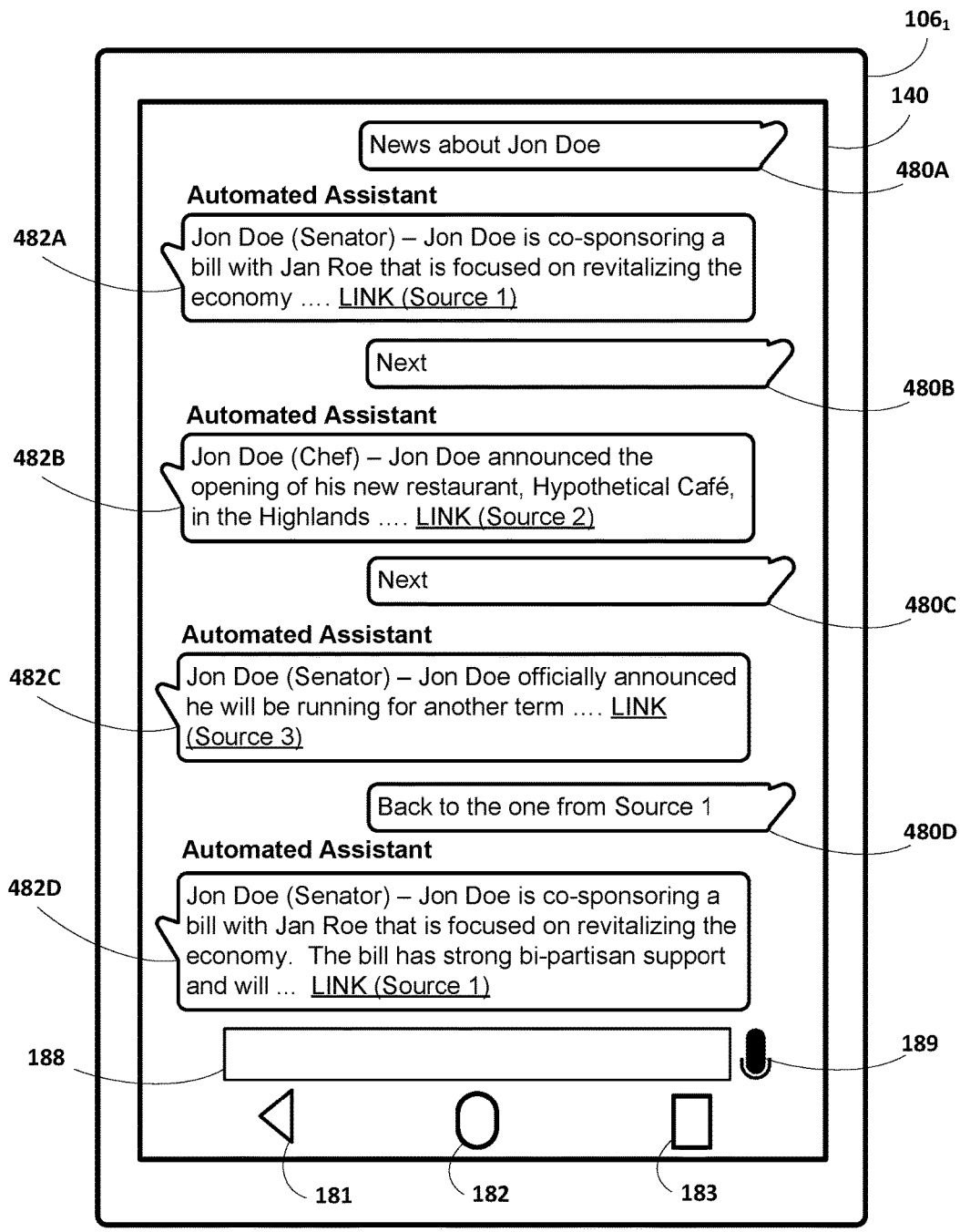
FIG. 4E illustrates the example client computing device of FIG. 3, with a display screen displaying yet another example of dialog that may occur between a user of the client computing device and an automated assistant according to implementations disclosed herein.

FIG. 4E illustrates an example that is similar to that of FIGS. 4A-4D, but where various dialog items persist in the dialog. In particular, in FIG. 4E textual inputs 480B, 480C, and 480D correspond to textual inputs 488B, 488C, and 488D of FIGS. 4B-4D. However, in FIG. 4E the textual inputs 480B, 480C, and 480D persist in the transcript of the dialog, whereas their counterparts do not in FIGS. 4B-4D.

Also, in FIG. 4E search results 482A, 482B, and 482C persist in the transcript of the dialog, whereas they do not in FIGS. 4B-4D.

In FIG. 5, the user provides initial textual input 580A as part of a dialog between the user and the automated assistant 120. In response to the textual input 580A, the automated assistant 120 obtains search results that are responsive to the textual input 580A and provides a search result 582A for audible presentation via a speaker of the computing device 510. The automated assistant 120 provides the search result 582A first based on it being first in an order of presentation of the search results.

During the audible providing of the search result 582A, the user provides textual input 582B that cuts off the providing of the search result 582A. The textual input 582B of "I never want news from Source 1" may be used to prevent further search results from Source 1 from being provided to the user by the automated assistant 120. For example, the automated assistant 120 may suppress search results having an attribute of Source 1 based on the sentiment indicated by "never". In some implementations, further search results from Source 1 may be suppressed only for those search results that are responsive to textual input 580A. In some other implementations, further search results from Source 1 may also be suppressed for search results that are responsive to further textual input. For instance, search results from Source 1 may continue to be suppressed by the automated assistant 120 until the user explicitly indicates, via further textual input and/or other interface input, that the user again wishes to receive search results from Source 1. In some implementations, lesser magnitudes of negative sentiment may result in lesser durations and/or extents of suppression of search results from Source 1. For example, "I'm not a big fan of Source 1" may cause search results from Source 1 to be demoted, but not excluded, based on sentiment associated with "not a big fan of" being of a lesser magnitude than the sentiment associated with "never". In some implementations, the direction (i.e., positive, negative) and/or magnitude of sentiment of terms associated with an attribute of a search result may be determined based on a sentiment classifier, one or more rules, and/or based on other techniques.

In response to the textual input 580B, the providing of search result 582A is ceased and search result 582B is provided. In some implementations, search result 582B is next in the order following search result 582B. In some other implementations, one or more intervening search results may be provided in the order between search result 582A and search result 582B, but the search result(s) skipped over by the automated assistant 120 based on them being associated with a source attribute of "Source 1."

During the audible providing of the search result 582B, the user provides textual input 580C that cuts off the providing of the search result 582B. In response to the textual input 580C of "next", the automated assistant may provide the next in the order search result 582C. During the audible providing of the search result 582C, the user provides textual input 580D that cuts off the providing of the search result 582C. In response to the textual input 580D of "next", the automated assistant may provide the next in the order search result 582D.

During the audible providing of the search result 582D, the user provides textual input 580E that cuts off the providing of the search result 582D. The automated assistant 120 may determine that "back" of the textual input 580E references a previously presented search result and that "Local Business" is an attribute of the previously presented search result 582B. In response, the automated assistant 120 again presents search result 582B, with more of the search result 582B being audibly presented due to the user not cutting off the audible presentation via further textual input.

Figure 6:
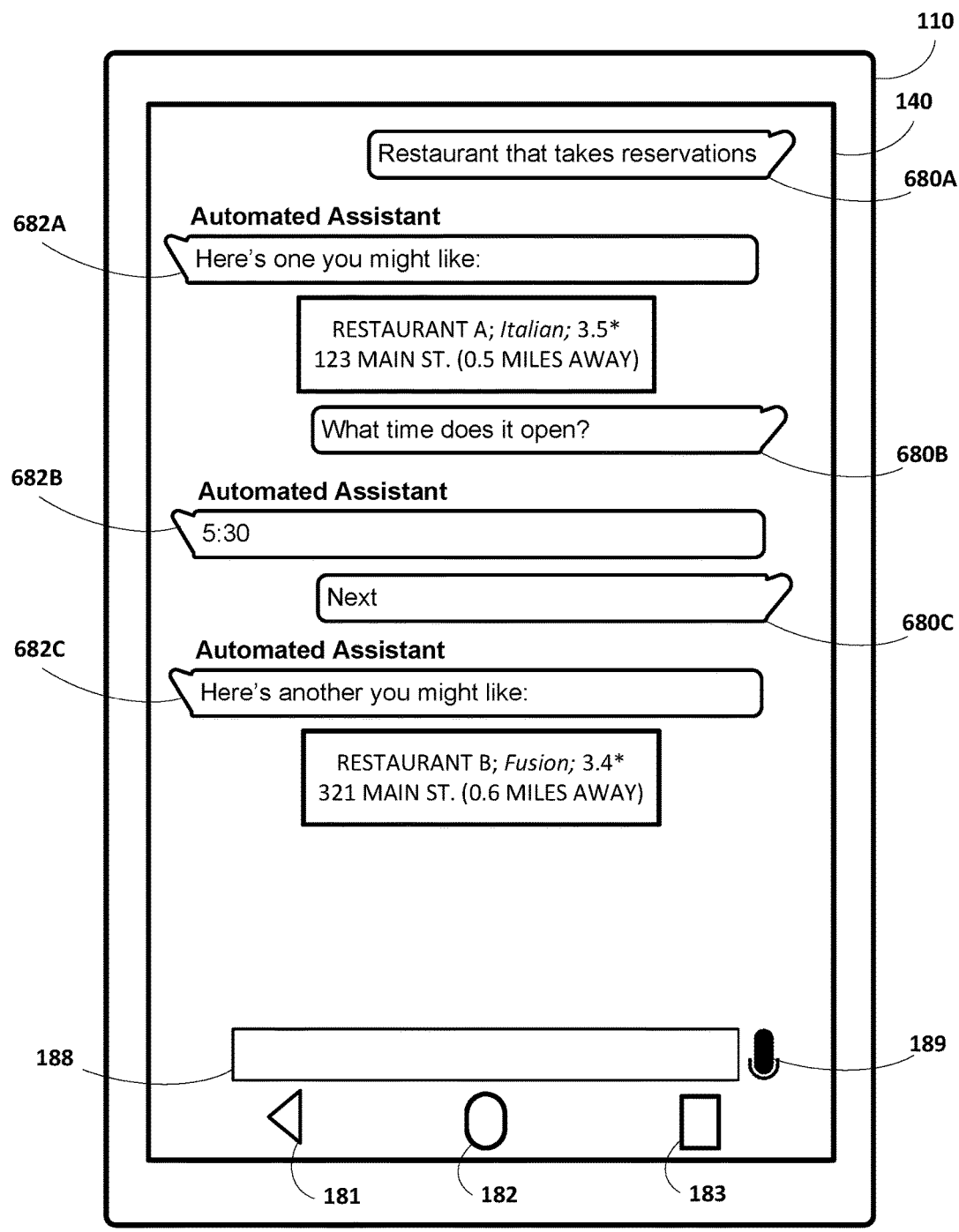
FIGS. 6 and 7 illustrate the example client computing device of FIG. 3, with a display screen displaying yet further examples of dialog that may occur between a user of the client computing device and an automated assistant according to implementations disclosed herein.
Figure 7:
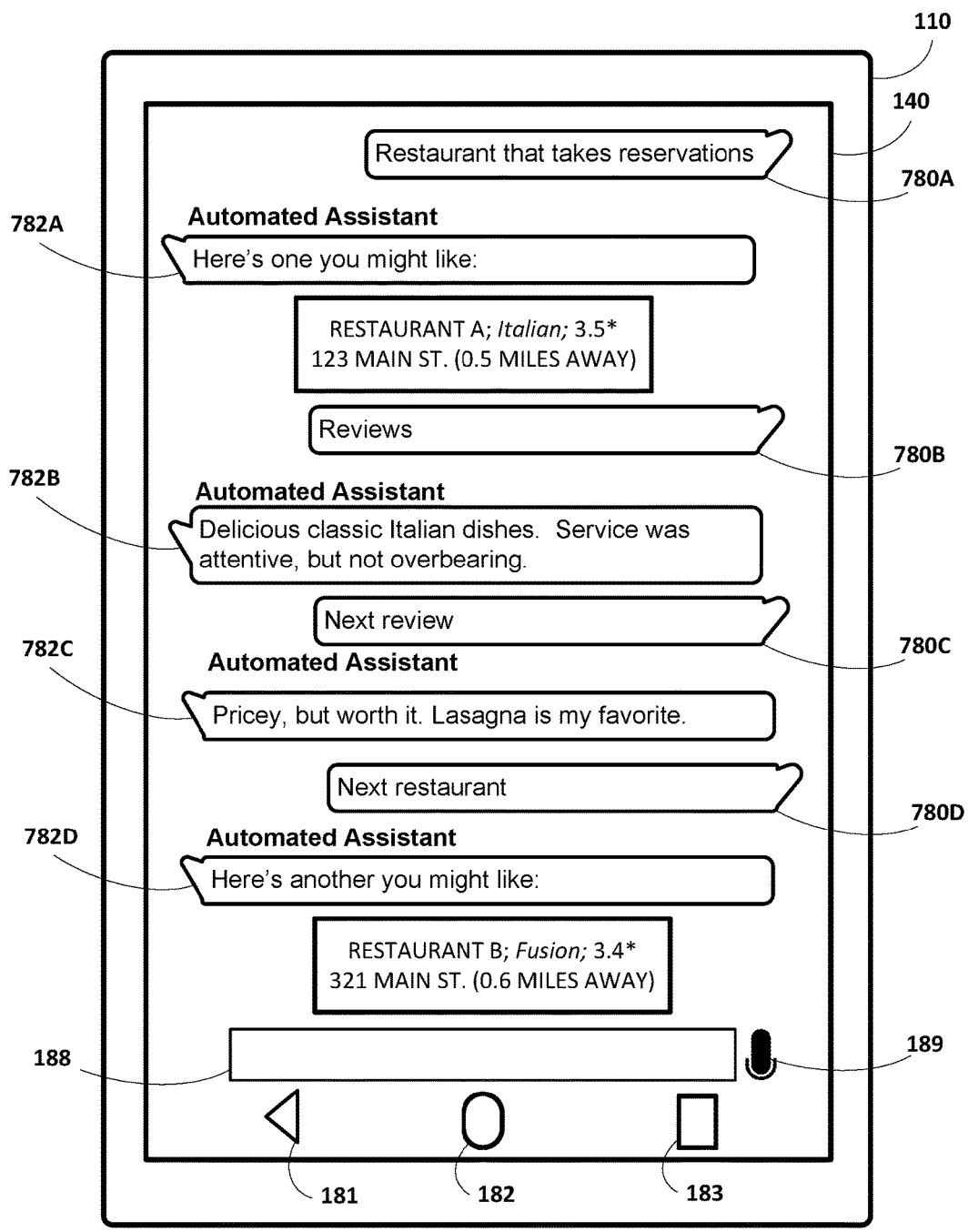

FIGS. 6 and 7 illustrate examples of how users may explore additional detail associated with a given search result via further dialog with the automated assistant 120, and then navigate forwards/backwards to other search results.

In FIG. 6, the user provides initial textual input 680A as part of a dialog between the user and the automated assistant 120. In response to the textual input 680A, the automated assistant 120 obtains search results that are responsive to the textual input 680A and provides a search result 682A for presentation as part of a transcript of the dialog. The automated assistant 120 provides the search result 682A first based on it being first in an order of presentation of the search results.

The user then provides textual input 680B of "What time does it open?" to cause the automated assistant 120 to present additional detail 682B that is related to the search result 682A and that is responsive to the textual input 680B. The user then provides textual input 680C of "next". The automated assistant 120 may determine that "next" references the next search result in the order and provide the next search result 682C in response to the textual input 680C. In some implementations, the automated assistant 120 may determine that "next" references the next search result and not further detail about the search result 682A based on the additional detail 682B being a singular item, instead of a list of items. In other words, there is only one "time that it opens" and "next" could not refer to an additional time that it opens.

In FIG. 7, the textual input 780A is the same as the textual input 680A of FIG. 6 and the search result 782A is the same as the search result 682A of FIG. 6. However, in FIG. 7 the textual input 780B differs from the textual input 680B of FIG. 6. The textual input 780B of "Reviews?" causes the automated assistant 120 to present additional detail 782B that is related to the search result 782A and that is responsive to the textual input 780B. The additional detail 782B is one of multiple available reviews for "Restaurant A."

The user then provides textual input 780C of "next review". Based on the presence of "review", the automated assistant 120 may determine that "next" references the next review, and not the next search result in the order. Accordingly, in response to the textual input 780C, the automated assistant 120 provides additional detail 782C that is another review of "Restaurant A".

The user then provides textual input 780D of "next restaurant". Based on the presence of "restaurant", the automated assistant 120 may determine that "next" references the next restaurant search result. Accordingly, in response to the textual input 780D, the automated assistant 120 provides additional search result 782D that is another restaurant search result responsive to textual input 780A.

Figure 8:
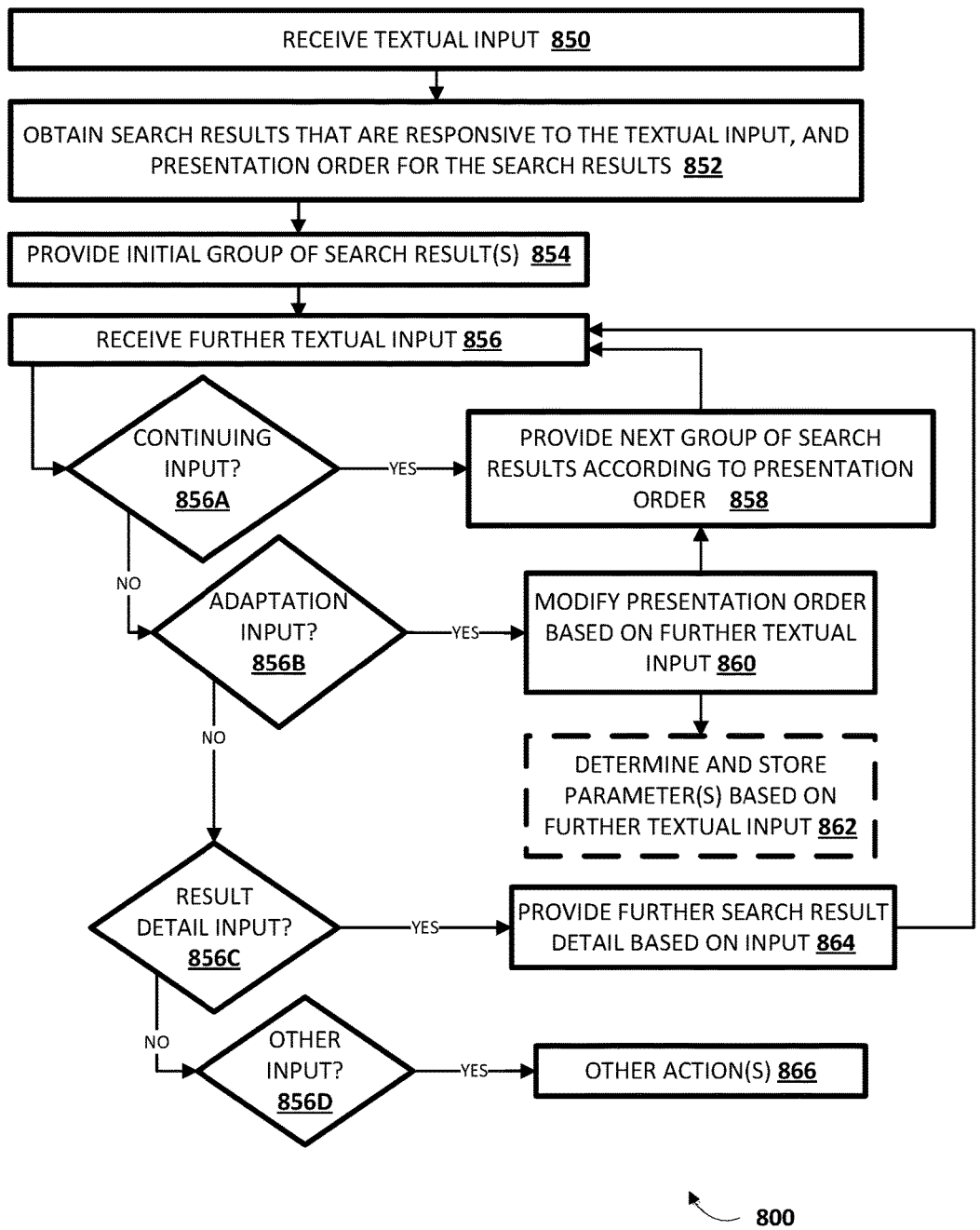
FIG. 8 is a flowchart illustrating an example method according to implementations disclosed herein.

FIG. 8 is a flowchart illustrating an example method 800 according to implementations disclosed herein. For convenience, the operations of the flow chart are described with reference to a system that performs the operations. This system may include various components of various computer systems, such as automated assistant 120. Moreover, while operations of method 800 are shown in a particular order, this is not meant to be limiting. One or more operations may be reordered, omitted or added.

At block 850, the system receives textual input. The textual input may be generated as part of a dialog by a user and the system, and may be based on user interface input generated by a user interface input device, such as a microphone or virtual keyboard.

At block 852, the system obtains search results that are responsive to the textual input and obtains a presentation order for the search results. The presentation order may be based on a ranking of the search results. In some implementations, the system itself performs a search to obtain the search results and/or rank the search results. In some implementations, the system provides search parameters to one or more separate systems and obtains search results and a ranking of the search results in response.

At block 854, the system provides an initial group of the search results. For example, the system may provide only the first search result according to the presentation order. The initial group of the search results is provided for audible and/or visual presentation to the user as part of the dialog.

At block 856, the system receives further textual input. The system then determines what type of input the further textual input is at one or more of blocks 856A, 856B, 856C, and 856D.

If it is determined at block 856A that the further textual input is continuing input, the system proceeds to block 858. At block 858, the system provides the next group of search results according to the presentation order. As one example of block 856A, the system may determine that the further textual input is continuing input if it includes only one or more of a set of predefined "continuing" terms such as "next", "continue", "go on", etc. As one example of block 858, the system may provide only the next search result according to the presentation order.

If instead it is determined at block 856B that the further textual input is adaptation input, the system proceeds to block 860. At block 860, the system modifies the presentation order based on the further textual input. The system then proceeds to block 858 and provides the next group of search results according to the presentation order (as modified at block 860). The system may additionally or alternatively proceed to block 862, where the system determines and stores parameter(s) based on the further textual input. As described herein, the parameters may modify identification and/or ranking of search results in downstream iterations of block 852.

As one example of block 856B, the system may determine that the further textual input is adaptation input if it includes one or more of a set of predefined "adaptation" terms (e.g., "back to", "forward to", "more like", "less like", "less about", "never", "remove") along with other term(s), conforms to one or more adaptation templates (e.g., "back to result [#]", "forward to result [#]"), and/or based on other techniques. As one example of block 860, the system may modify the presentation order to promote, demote, or remove one or more search results having an attribute explicitly or implicitly referenced in the further textual input.

If instead it is determined at block 856C that the further textual input is result detail input, the system proceeds to block 864. At block 864, the system provides further search result detail based on the input. As one example of block 856C, the system may determine that the further textual input is result detail input if it requests further content related to search result(s) provided at block 854. For instance, if a "restaurant" search result is provided at block 854, further textual input of "reviews for this restaurant" may be determined to be result detail input.

If instead it is determined at block 856D that the further textual input is other input, the system proceeds to block 866 and performs other action(s). For example, the textual input may be input intended to initiate a new search and the other actions of block 866 may be to proceed back to block 852 and obtain search results that are responsive to the further textual input. Also, for example, the textual input may be input that solicits a single response such as "what time is it" and the further actions of block 866 may be to provide output that indicates the current time, then to return to block 856.

Multiple iterations of blocks 856, 856A/B/C/D, 858, 860, 862, 864, and/or 866 may occur during a dialog with a user to enable the user to navigate and explore multiple search results according to techniques disclosed herein. Although blocks 856A, 856B, 856C, and 856D are illustrated in a particular order, it is understood the order may be altered, one or more blocks may be performed in parallel, and/or one or more blocks may only be selectively performed.

Figure 9:
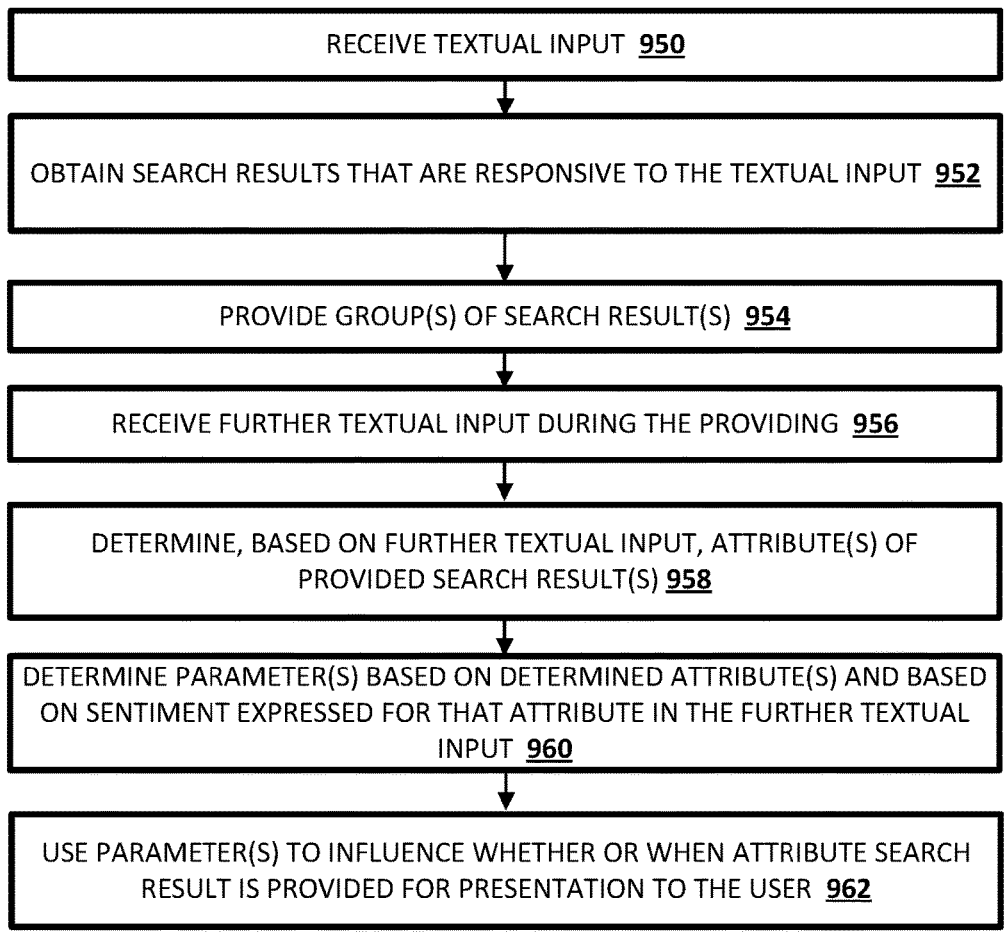
FIG. 9 is a flowchart illustrating another example method according to implementations disclosed herein

FIG. 9 is a flowchart illustrating an example method 900 according to implementations disclosed herein. For convenience, the operations of the flow chart are described with reference to a system that performs the operations. This system may include various components of various computer systems, such as automated assistant 120. Moreover, while operations of method 900 are shown in a particular order, this is not meant to be limiting. One or more operations may be reordered, omitted or added.

At block 950, the system receives textual input. The textual input may be generated as part of a dialog by a user and the system, and may be based on user interface input generated by a user interface input device, such as a microphone or virtual keyboard.

At block 952, the system obtains search results that are responsive to the textual input. In some implementations, at block 952 the system also obtains a presentation order for the search results.

At block 954, the system provides one or more groups of the search results. For example, the system may provide a first search result, then a second search result, then a third search result, etc.

At block 956, the system receives textual input during the providing of block 954.

At block 958, the system determines, based on the textual input, one or more attributes of one or more search results provided at block 954. For example, the textual input may be "never show results from this source". Based on "this source", the system may determine a source attribute that is assigned to the most recently provided search result. As another example, the textual input may be "more like this". Based on "like this", the system may determine an attribute that is assigned to the most recently provided search result such as a source attribute, a topic attribute, a document type attribute (e.g., image, video, or webpage), etc. As yet another example, the textual input may be "no more from Source 1" and the system may determine a source attribute of "Source 1" that is also a source attribute of one or more of the search results provided at block 954.

At block 960, the system determines a parameter based on the determined attribute(s) and sentiment expressed for that attribute in the further textual input of block 956. A given parameter may define an attribute and how to influence search results having that attribute. The system may determine how to influence search results having that attribute based on the sentiment expressed for that attribute in the further textual input. In some implementations, the system may access a mapping of certain sentiment terms to certain influences to determine the influence. For instance, "never" may be mapped to suppressing search results having that attribute, "don't like" may be mapped to demoting to a first degree search results having that attribute, "really don't like" may be mapped to demoting to a greater second degree search results having that attribute, "more like" may be mapped to promoting to a first degree search results having that attribute, etc. In some implementations, the system may additionally or alternatively utilize a sentiment classifier to determine a direction and/or magnitude of sentiment, and may determine how to influence search results having that attribute based on the direction and/or magnitude At block 962, the system uses the parameter to influence whether or when one or more attribute search results having that attribute are provided for presentation to the user. In some implementations, the system uses the parameter to influence one or more of the search results obtained at block 952 and resultantly influence further providing of search results in response to the textual input received at block 950. In some implementations, the system additionally or alternatively uses the parameter to influence one or more search results for downstream searches based on downstream textual input in dialog between the user and the system.

Various examples described herein are described with respect to visual presentation of search results via a graphical user interface and/or audible presentation of search results via a speaker. However, in some implementations search results may be provided for presentation to the user using additional and/or alternative techniques. For example, in some implementations search results may be provided for tactile presentation to a user. As another example, in some implementations search results may include a plurality of lighting commands and/or lighting scenes to be implemented by a lighting system and each of the search results may be presented as lighting output from the lighting system. For instance, providing a lighting scene search result for presentation to a user may include providing command(s) or other output to a lighting system controller and/or to individual components of the lighting system (e.g., individual bulbs or other lighting units) that cause a lighting scene that corresponds to the lighting scene search result to be generated by the lighting system. As one particular example, a first lighting scene search result may be presented to the user as lighting output from the lighting system; in response to "next" user interface input, the next lighting scene in an order of the search results may be presented; in response to another "next" user interface input, the next lighting scene in the order may be presented; and in response to further user interface input that identifies a previously presented search result, another search result may be presented that is counter to the order of the search results. For example, further textual input of "back to the first lighting scene" may cause the initially presented lighting scene to again be presented, further textual input of "back to the one with a lot of red" may cause a previously provided lighting scene with an attribute of "red" to again be presented, further textual input of "more like this" may cause a yet to be presented scene to be presented, where that scene is counter to the order and is identified based on sharing attribute(s) with the currently presented scene. As another particular example, a given lighting scene search result may be presented to the user as lighting output from the lighting system and, while the given lighting scene search result is being presented, the user may provide further user interface input of "never any lighting scenes like this". Such further user interface input may be utilized to determine whether or when further lighting scene search results having one or more attributes in common with the given lighting scene search result are presented in response to further dialog.

Figure 10:
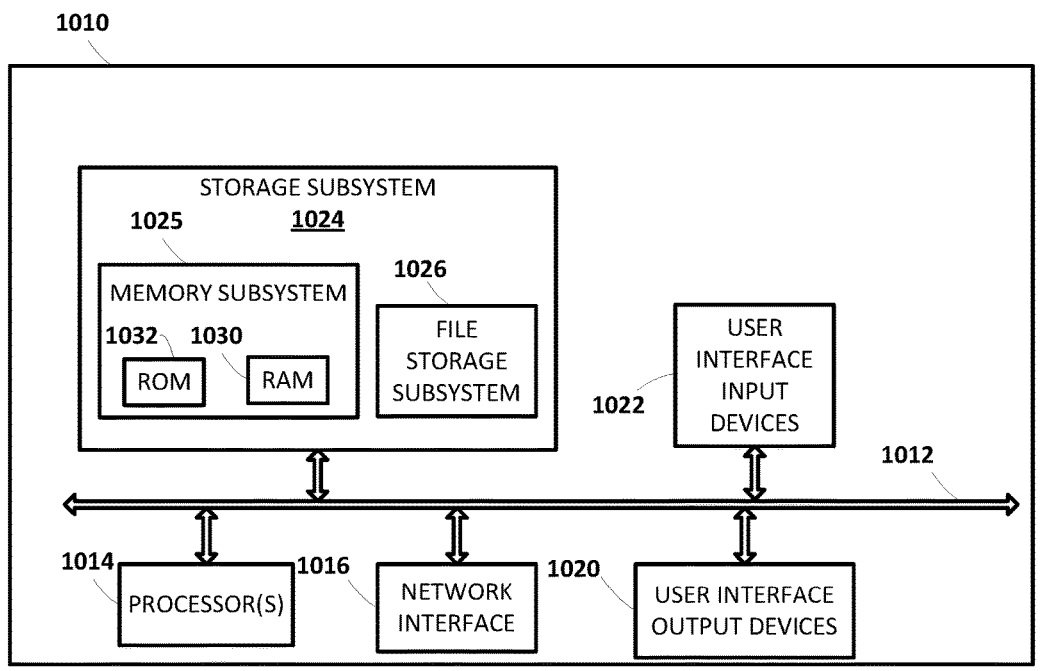
FIG. 10 illustrates an example architecture of a computing device.

FIG. 10 is a block diagram of an example computing device 1010 that may optionally be utilized to perform one or more aspects of techniques described herein. In some implementations, one or more of a client computing device, automated assistant 120, and/or other component(s) may comprise one or more components of the example computing device 1010.

Computing device 1010 typically includes at least one processor 1014 which communicates with a number of peripheral devices via bus subsystem 1012. These peripheral devices may include a storage subsystem 1024, including, for example, a memory subsystem 1025 and a file storage subsystem 1026, user interface output devices 1020, user interface input devices 1022, and a network interface subsystem 1016. The input and output devices allow user interaction with computing device 1010. Network interface subsystem 1016 provides an interface to outside networks and is coupled to corresponding interface devices in other computing devices.

User interface input devices 1022 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1010 or onto a communication network.

User interface output devices 1020 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1010 to the user or to another machine or computing device.

Storage subsystem 1024 stores programming and data constructs that provide the functionality of some or all of the modules described herein. For example, the storage subsystem 1024 may include the logic to perform selected aspects of the method of FIG. 8 and/or the method of FIGS. 9.

These software modules are generally executed by processor 1014 alone or in combination with other processors. Memory 1025 used in the storage subsystem 1024 can include a number of memories including a main random access memory (RAM) 630 for storage of instructions and data during program execution and a read only memory (ROM) 632 in which fixed instructions are stored. A file storage subsystem 1026 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1026 in the storage subsystem 1024, or in other machines accessible by the processor(s) 1014.

Bus subsystem 1012 provides a mechanism for letting the various components and subsystems of computing device 1010 communicate with each other as intended. Although bus subsystem 1012 is shown schematically as a single bus, alternative implementations of the bus subsystem may use multiple busses.

Computing device 1010 can be of varying types including a workstation, server, computing cluster, blade server, server farm, or any other data processing system or computing device. Due to the ever-changing nature of computers and networks, the description of computing device 1010 depicted in FIG. 10 is intended only as a specific example for purposes of illustrating some implementations. Many other configurations of computing device 1010 are possible having more or fewer components than the computing device depicted in FIG. 10.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
   receiving audible input, the audible input being based on user interface input generated by a user via a user interface input device,
   wherein the user interface input is generated by the user as part of dialog between the user and an automated assistant implemented at least in part by one or more of the processors;
   obtaining a plurality of search results that are responsive to the audible input;
   sequentially providing groups of the search results for presentation to the user via a user interface output device, wherein each of the groups of the search results includes at least one of the search results, and wherein sequentially providing the groups of the search results comprises providing each of the groups according to an order of the groups;
   receiving further audible input during the sequentially providing and during the presentation of at least one of the groups of the search results during the sequentially providing, the further audible input being based on further user interface input generated by the user via the user interface input device or another user interface input device;
   determining, based on one or more terms of the further audible input and based on at least one attribute of a previously presented search result, that the further audible input corresponds to the previously presented search result, the previously presented search result being one of the search results that was previously provided during the sequentially providing,
   wherein determining, based on the one or more terms of the further audible input and based on the at least one attribute of the previously presented search result, that the further audible input corresponds to the previously presented search result comprises determining the one or more of the terms of the further audible input match the at least one attribute of the previously presented search result; and
   in response to determining that the further audible input, received during the sequentially providing and during the presentation of the at least one of the groups of the search results during the sequentially providing, corresponds to the previously presented search result:
   providing output related to the previously presented search result, the providing of the output being counter to the order of the groups of the search results being sequentially provided.

2. The method of claim 1, wherein sequentially providing the groups of the search results for presentation to the user comprises:
   providing an initial group of the groups in response to the audible input; and
   providing a second group following the initial group, wherein the second group sequentially follows the initial group according to the order, wherein providing the second group is in response to receiving additional user interface input, and wherein the additional user interface input precedes the further audible input.

3. The method of claim 1, wherein the user interface input device is a microphone, the user interface output device is a speaker, and wherein the further audible input is generated by the user via the microphone.

4. The method of claim 3, wherein at least part of the further audible input is received during audible presentation of one of the search results via the speaker.

5. The method of claim 1, further comprising:
   actively monitoring for the further audible input during the sequentially providing;
   wherein receiving the further audible input occurs during the actively monitoring.

6. The method of claim 1, wherein the user interface output device is a display, wherein the output includes the previously presented search result, and wherein providing the output comprises:
   causing the output to be presented, in a graphical user interface presented on the display, separate and apart from any persistent output from the previous presentation of the previously presented search result.

7. The method of claim 1, wherein the output is an additional search result that is related to the previously presented search result, but associated with a different underlying content item than the previously presented search result.

8. The method of claim 1, wherein the user interface output device is a display, and wherein sequentially providing the groups for presentation to the user via the display comprises:
   causing each of the groups to supplant, in a graphical user interface presented on the display, a corresponding immediately preceding group of the groups.

9. The method of claim 8, wherein providing the output related to the previously presented search result comprises:
   causing the output to supplant, in the graphical user interface, a most recently provided group of the groups provided during the sequentially providing.

10. The method of claim 1, wherein the at least one attribute is one of: a name of a source of the previously presented search result, a name of an entity included in the previously presented search result, and a reference to a presentation order of the previously presented search result in the sequentially providing of the groups.

11. The method of claim 1, further comprising:
    determining, based on one or more of the terms of the further audible input, that the further audible input also corresponds to an additional previously presented search result, of the search results, that was previously provided during the sequentially providing;
    wherein determining that the further audible input corresponds to the previously presented search result further comprises:
    selecting the previously presented search result instead of the additional previously presented search result based on one or more additional criteria.

12. The method of claim 1, further comprising:
    determining, based on one or more of the terms of the further audible input, that the further audible input also corresponds to an additional previously presented search result, of the search results, that was previously provided during the sequentially providing;
    wherein determining that the further audible input corresponds to the previously presented search result comprises:
    generating a prompt based on an additional attribute of the additional previously presented search result,
    providing the prompt for presentation to the user via the user interface output device,
    receiving, responsive to the prompt, additional user interface input, and
    selecting the previously presented search result instead of the additional previously presented search result based on the additional user interface input.

13. A method implemented by one or more processors, comprising:
    as part of a dialog between a user and an automated assistant implemented at least in part by one or more of the processors:
    providing a search result for presentation to the user; and
    in response to providing the search result, receiving textual input that references an attribute of the search result and that references a sentiment expressed by the user towards the attribute, the textual input being based on user interface input generated by the user via a user interface input device;
    determining, based on the attribute of the search result and the sentiment expressed by the user towards the attribute, a parameter that influences whether or when one or more attribute search results that have the attribute are provided by the automated assistant in response to further dialog between the user and the automated assistant; and
    as part of the further dialog between the user and the automated assistant:
    using, by the automated assistant, the parameter to influence whether or when at least one of the attribute search results is provided for presentation to the user, wherein the parameter either:
    influences when the attribute search results are provided as part of the further dialog by influencing a ranking of the attribute search results to a degree that is based on the sentiment expressed by the user toward the attribute of the attribute search results, or
    influences whether the attribute search results are provided as part of the further dialog by preventing the attribute search results from being provided, wherein the parameter prevents the attribute search results from being provided based on the sentiment expressed by the user toward the attribute being expressed in the textual input by one or more predefined terms.

14. The method of claim 13, wherein the attribute of the search result is a source of the search result, and wherein the textual input includes a term that references the source and an additional term that references the sentiment.

15. The method of claim 13, wherein the reference to the attribute in the textual input is a reference to the search result without an explicit reference to the attribute, and further comprising:
    identifying the attribute based on the attribute being assigned to the search result in one or more computer readable media.

16. The method of claim 15, wherein the attribute is one of: a source of the search result, an entity referenced in the search result, and a document type of the search result.

17. The method of claim 13, wherein the search result is provided for presentation to the user in response to first textual input of the user, wherein the further dialog is a continuance of the dialog and is a continuance of sequential presentation of search results responsive to the first textual input, and wherein the at least one of the attribute search results is responsive to the first textual input.

18. The method of claim 13, wherein the search result is provided for presentation to the user in response to first textual input of the user, wherein the further dialog includes providing additional search results to the user in response to a new search issued for additional textual input of the user, and wherein the at least one of the attribute search results is responsive to the additional textual input.

19. A computing system, comprising:
    a user interface input device;
    a display;
    at least one processor; and
    at least one computer-readable storage device storing instructions that, when executed by the at least one processor, cause the at least one processor to:
    receive audible input, the audible input being based on user interface input generated by a user via the user interface input device, wherein the user interface input is generated by the user as part of dialog between the user and an automated assistant implemented at least in part by one or more of the processors;

obtain a plurality of search results that are responsive to the audible input;

sequentially provide groups of the search results for presentation to the user via the display, wherein each of the groups of the search results includes at least one of the search results, and wherein sequentially providing the groups of the search results comprises providing each of the groups according to an order of the groups, wherein the instructions to sequentially provide the groups for presentation to the user via the display further comprises instructions to:

cause each of the groups to supplant, in a graphical user interface presented on the display and during the sequentially providing, a corresponding immediately preceding group of the groups;

receive further audible input during the sequentially providing and during the presentation of at least one of the groups of the search results during the sequentially providing, the further audible input being based on further user interface input generated by the user via the user interface input device or another user interface input device;

determine, based on one or more terms of the further audible input and based on at least one attribute of a previously presented search result, that the further audible input corresponds to the previously presented search result, the previously presented search result being one of the search results that was previously provided during the sequentially providing; and in response to determining that the further audible input, received during the sequentially providing and during the presentation of the at least one of the groups of the search results during the sequentially providing, corresponds to the previously presented search result:

provide output related to the previously presented search result, the providing of the output being counter to the order of the groups of the search results being sequentially provided, wherein the instructions to provide the output related to the previously presented search result further comprise instructions to:

cause the output to supplant, in the graphical user interface, a most recently provided group of the groups.

* * * * *